(12) United States Patent
Goergen et al.

(10) Patent No.: US 11,838,060 B2
(45) Date of Patent: Dec. 5, 2023

(54) POWER DELIVERY THROUGH AN OPTICAL SYSTEM

(71) Applicant: Cisco Technology, Inc., San Jose, CA (US)

(72) Inventors: Joel Richard Goergen, Soulsbyville, CA (US); Charles Calvin Byers, Wheaton, IL (US); Robert Gregory Twiss, Chapel Hill, NC (US); D. Brice Achkir, Livermore, CA (US); Chad M. Jones, Doylestown, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 113 days.

(21) Appl. No.: 17/502,848

(22) Filed: Oct. 15, 2021

(65) Prior Publication Data

US 2022/0038189 A1 Feb. 3, 2022

Related U.S. Application Data

(60) Division of application No. 16/601,153, filed on Oct. 14, 2019, now Pat. No. 11,212,013, which is a
(Continued)

(51) Int. Cl.
*H04B 10/80* (2013.01)
*G02B 6/42* (2006.01)
*H04L 12/40* (2006.01)
*H04M 19/08* (2006.01)
*H04L 12/12* (2006.01)
(Continued)

(52) U.S. Cl.
CPC ......... *H04B 10/807* (2013.01); *G02B 6/4293* (2013.01); *H02J 50/30* (2016.02); *H02J 50/80* (2016.02); *H04L 12/10* (2013.01); *H04L 12/12* (2013.01); *H04L 12/40045* (2013.01); *H04L 12/40091* (2013.01); *H04L 12/40176* (2013.01);
(Continued)

(58) Field of Classification Search
None
See application file for complete search history.

(56) References Cited

U.S. PATENT DOCUMENTS

| | | | |
|---|---|---|---|
| 3,335,324 | A | 8/1967 | Buckeridge |
| 4,811,187 | A | 3/1989 | Nakajima |

(Continued)

FOREIGN PATENT DOCUMENTS

| | | |
|---|---|---|
| CN | 1209880 C | 7/2005 |
| CN | 201689347 U | 12/2010 |

(Continued)

OTHER PUBLICATIONS

Office Action in counterpart European Application No. 18780270.7, dated Feb. 11, 2022, 7 pages.
(Continued)

*Primary Examiner* — David W Lambert

(57) ABSTRACT

In one embodiment, a method includes receiving power delivered over a data fiber cable at an optical transceiver installed at a network communications device and transmitting data and the power from the optical transceiver to the network communications device. The network communications device is powered by the power received from the optical transceiver. An apparatus is also disclosed herein.

25 Claims, 17 Drawing Sheets

Related U.S. Application Data continuation of application No. 15/707,976, filed on Sep. 18, 2017, now Pat. No. 10,541,758.

(51) Int. Cl.

| | | |
|---|---|---|
| *H04L 12/10* | (2006.01) | |
| *H02J 50/80* | (2016.01) | |
| *H02J 50/30* | (2016.01) | |
| *G02B 6/38* | (2006.01) | |
| *H02S 40/38* | (2014.01) | |
| *G01J 3/02* | (2006.01) | |

(52) U.S. Cl.
CPC ........... *H04M 19/08* (2013.01); *G01J 3/0218* (2013.01); *G02B 6/3817* (2013.01); *H02S 40/38* (2014.12)

(56) References Cited

U.S. PATENT DOCUMENTS

| | | |
|---|---|---|
| 4,986,625 A | 1/1991 | Yamada et al. |
| 5,652,893 A | 7/1997 | Ben-Meir et al. |
| 6,008,631 A | 12/1999 | Johari |
| 6,220,955 B1 | 4/2001 | Posa |
| 6,259,745 B1 | 7/2001 | Chan |
| 6,636,538 B1 | 10/2003 | Stephens |
| 6,685,364 B1 | 2/2004 | Brezina |
| 6,784,790 B1 | 8/2004 | Lester |
| 6,826,368 B1 | 11/2004 | Koren |
| 6,855,881 B2 | 2/2005 | Khoshnood |
| 6,860,004 B2 | 3/2005 | Hirano et al. |
| 7,325,150 B2 | 1/2008 | Lehr |
| 7,420,355 B2 | 9/2008 | Liu |
| 7,490,996 B2 | 2/2009 | Sommer |
| 7,492,059 B2 | 2/2009 | Peker et al. |
| 7,509,505 B2 | 3/2009 | Randall et al. |
| 7,566,987 B2 | 7/2009 | Black et al. |
| 7,583,703 B2 | 9/2009 | Bowser |
| 7,589,435 B2 | 9/2009 | Metsker |
| 7,593,747 B1 | 9/2009 | Karam |
| 7,603,570 B2 | 10/2009 | Schindler et al. |
| 7,616,465 B1 | 11/2009 | Vinciarelli |
| 7,813,646 B2 | 10/2010 | Furey |
| 7,835,389 B2 | 11/2010 | Yu |
| 7,854,634 B2 | 12/2010 | Filipon et al. |
| 7,881,072 B2 | 2/2011 | Dibene, II et al. |
| 7,915,761 B1 | 3/2011 | Jones |
| 7,921,307 B2 | 4/2011 | Karam |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,035,973 B2 | 10/2011 | McColloch |
| 8,037,324 B2 | 10/2011 | Hussain |
| 8,068,937 B2 | 11/2011 | Eaves |
| 8,081,589 B1 | 12/2011 | Gilbrech et al. |
| 8,184,525 B2 | 5/2012 | Karam |
| 8,276,397 B1 | 10/2012 | Carlson |
| 8,279,883 B2 | 10/2012 | Diab et al. |
| 8,310,089 B2 | 11/2012 | Schindler |
| 8,319,627 B2 | 11/2012 | Chan et al. |
| 8,345,439 B1 | 1/2013 | Goergen |
| 8,350,538 B2 | 1/2013 | Cuk |
| 8,358,893 B1 * | 1/2013 | Sanderson ........... G02B 6/4415 385/115 |
| 8,386,820 B2 | 2/2013 | Diab |
| 8,638,008 B2 | 1/2014 | Baldwin et al. |
| 8,700,923 B2 | 4/2014 | Fung |
| 8,712,324 B2 | 4/2014 | Corbridge et al. |
| 8,750,710 B1 | 6/2014 | Hirt et al. |
| 8,768,528 B2 | 7/2014 | Millar et al. |
| 8,781,637 B2 | 7/2014 | Eaves |
| 8,787,775 B2 | 7/2014 | Earnshaw |
| 8,829,917 B1 | 9/2014 | Lo |
| 8,836,228 B2 | 9/2014 | Xu |
| 8,842,430 B2 | 9/2014 | Hellriegel |
| 8,849,471 B2 | 9/2014 | Daniel et al. |
| 8,966,747 B2 | 3/2015 | Vinciarelli et al. |
| 9,019,895 B2 | 4/2015 | Li et al. |
| 9,024,473 B2 | 5/2015 | Huff |
| 9,184,795 B2 | 11/2015 | Eaves |
| 9,189,036 B2 | 11/2015 | Ghoshal et al. |
| 9,189,043 B2 | 11/2015 | Vorenkamp |
| 9,273,906 B2 | 3/2016 | Goth |
| 9,319,101 B2 | 4/2016 | Lontka |
| 9,321,362 B2 | 4/2016 | Woo et al. |
| 9,373,963 B2 | 6/2016 | Kuznelsov |
| 9,419,436 B2 | 8/2016 | Eaves |
| 9,484,771 B2 | 11/2016 | Braylovskiy et al. |
| 9,510,479 B2 | 11/2016 | Vos |
| 9,531,551 B2 | 12/2016 | Balasubramanian |
| 9,590,811 B2 | 3/2017 | Hunter, Jr. |
| 9,618,714 B2 | 4/2017 | Murray |
| 9,640,998 B2 | 5/2017 | Dawson |
| 9,651,751 B1 | 5/2017 | Ding et al. |
| 9,665,148 B2 | 5/2017 | Hamdi |
| 9,693,244 B2 | 6/2017 | Maruhashi |
| 9,734,940 B1 | 8/2017 | McNutt |
| 9,853,689 B2 | 12/2017 | Eaves |
| 9,874,930 B2 | 1/2018 | Vavilala |
| 9,882,656 B2 | 1/2018 | Sipes, Jr. |
| 9,893,521 B2 | 2/2018 | Lowe |
| 9,948,198 B2 | 4/2018 | Imai |
| 9,979,370 B2 | 5/2018 | Xu |
| 9,985,600 B2 | 5/2018 | Xu et al. |
| 10,007,628 B2 | 6/2018 | Pitigoi-Aron |
| 10,028,417 B2 | 7/2018 | Schmidtke |
| 10,128,764 B1 | 11/2018 | Vinciarelli |
| 10,248,178 B2 | 4/2019 | Brooks et al. |
| 10,263,526 B2 | 4/2019 | Sandusky et al. |
| 10,407,995 B2 | 9/2019 | Moeny |
| 10,439,432 B2 | 10/2019 | Eckhardt et al. |
| 10,468,879 B2 | 11/2019 | Eaves |
| 10,541,543 B2 | 1/2020 | Eaves |
| 10,714,930 B1 | 7/2020 | Weiss et al. |
| 10,735,105 B2 | 8/2020 | Goergen et al. |
| 2001/0024373 A1 | 9/2001 | Cuk |
| 2002/0126967 A1 | 9/2002 | Panak |
| 2004/0000816 A1 | 1/2004 | Khoshnood |
| 2004/0033076 A1 | 2/2004 | Song |
| 2004/0043651 A1 | 3/2004 | Bain |
| 2004/0073703 A1 | 4/2004 | Boucher |
| 2004/0223768 A1 | 11/2004 | Shastri et al. |
| 2004/0264214 A1 | 12/2004 | Xu et al. |
| 2005/0197018 A1 | 9/2005 | Lord |
| 2005/0268120 A1 | 12/2005 | Schindler |
| 2006/0202109 A1 | 9/2006 | Delcher |
| 2006/0209875 A1 | 9/2006 | Lum et al. |
| 2006/0268898 A1 | 11/2006 | Karam |
| 2007/0041732 A1 | 2/2007 | Oki et al. |
| 2007/0103168 A1 | 5/2007 | Batten |
| 2007/0236853 A1 | 10/2007 | Crawley |
| 2007/0263675 A1 | 11/2007 | Lum et al. |
| 2007/0284941 A1 | 12/2007 | Robbins |
| 2007/0284946 A1 | 12/2007 | Robbins |
| 2007/0288125 A1 | 12/2007 | Quaratiello |
| 2007/0288771 A1 | 12/2007 | Robbins |
| 2008/0063399 A1 | 3/2008 | Mallya et al. |
| 2008/0198635 A1 | 8/2008 | Hussain |
| 2008/0229120 A1 | 9/2008 | Diab |
| 2008/0310067 A1 | 12/2008 | Diab |
| 2010/0077239 A1 | 3/2010 | Diab |
| 2010/0117808 A1 | 5/2010 | Karam |
| 2010/0171602 A1 | 7/2010 | Kabbara |
| 2010/0190384 A1 | 7/2010 | Lanni |
| 2010/0237846 A1 | 9/2010 | Vetteth |
| 2010/0290190 A1 | 11/2010 | Chester |
| 2011/0004773 A1 | 1/2011 | Hussain et al. |
| 2011/0007664 A1 | 1/2011 | Diab et al. |
| 2011/0057612 A1 | 3/2011 | Taguchi et al. |
| 2011/0083824 A1 | 4/2011 | Rogers |
| 2011/0181436 A1 | 7/2011 | Davey et al. |
| 2011/0228578 A1 | 9/2011 | Serpa et al. |
| 2011/0266867 A1 | 11/2011 | Schindler |

(56) References Cited

U.S. PATENT DOCUMENTS

| | | |
|---|---|---|
| 2011/0290497 A1 | 12/2011 | Stenevik |
| 2012/0043935 A1 | 2/2012 | Dyer et al. |
| 2012/0064745 A1 | 3/2012 | Ottliczky |
| 2012/0170927 A1 | 7/2012 | Huang |
| 2012/0177381 A1 | 7/2012 | Dobbelaere et al. |
| 2012/0201089 A1 | 8/2012 | Barth |
| 2012/0231654 A1 | 9/2012 | Conrad |
| 2012/0287984 A1 | 11/2012 | Lee |
| 2012/0317426 A1 | 12/2012 | Hunter, Jr. |
| 2012/0319468 A1 | 12/2012 | Schneider |
| 2013/0077923 A1 | 3/2013 | Weem |
| 2013/0079633 A1 | 3/2013 | Peeters et al. |
| 2013/0103220 A1 | 4/2013 | Eaves |
| 2013/0249292 A1 | 9/2013 | Blackwell, Jr. |
| 2013/0272721 A1 | 10/2013 | Van Veen |
| 2013/0329344 A1 | 12/2013 | Tucker et al. |
| 2014/0111180 A1 | 4/2014 | Vladan et al. |
| 2014/0126151 A1 | 5/2014 | Campbell et al. |
| 2014/0129850 A1 | 5/2014 | Paul |
| 2014/0258742 A1 | 9/2014 | Chien |
| 2014/0265550 A1 | 9/2014 | Milligan et al. |
| 2014/0372773 A1 | 12/2014 | Heath et al. |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0215001 A1 | 7/2015 | Eaves |
| 2015/0215131 A1 | 7/2015 | Paul et al. |
| 2015/0304742 A1 | 10/2015 | Siddhaye et al. |
| 2015/0333918 A1 | 11/2015 | White, III |
| 2015/0340818 A1 | 11/2015 | Scherer et al. |
| 2015/0365003 A1 | 12/2015 | Sadwick |
| 2016/0018252 A1 | 1/2016 | Hanson et al. |
| 2016/0020911 A1* | 1/2016 | Sipes, Jr. ............... H04B 10/40 398/16 |
| 2016/0064938 A1 | 3/2016 | Balasubramanian |
| 2016/0111877 A1 | 4/2016 | Eaves |
| 2016/0118784 A1 | 4/2016 | Saxena et al. |
| 2016/0133355 A1 | 5/2016 | Glew et al. |
| 2016/0134331 A1 | 5/2016 | Eaves |
| 2016/0142217 A1 | 5/2016 | Gardner |
| 2016/0188427 A1 | 6/2016 | Chandrashekar et al. |
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer |
| 2016/0273722 A1 | 9/2016 | Crenshaw |
| 2016/0294500 A1 | 10/2016 | Chawgo |
| 2016/0294568 A1 | 10/2016 | Chawgo et al. |
| 2016/0308683 A1 | 10/2016 | Pischl |
| 2016/0352535 A1 | 12/2016 | Hiscock |
| 2017/0041152 A1 | 2/2017 | Sheffield |
| 2017/0041153 A1 | 2/2017 | Picard et al. |
| 2017/0054296 A1 | 2/2017 | Daniel |
| 2017/0110871 A1 | 4/2017 | Foster |
| 2017/0123466 A1 | 5/2017 | Carnevale |
| 2017/0146260 A1 | 5/2017 | Ribbich |
| 2017/0155517 A1 | 6/2017 | Cao |
| 2017/0164525 A1 | 6/2017 | Chapel |
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0244318 A1 | 8/2017 | Giuliano |
| 2017/0248976 A1 | 8/2017 | Moller |
| 2017/0294966 A1 | 10/2017 | Jia et al. |
| 2017/0325320 A1 | 11/2017 | Wendt |
| 2018/0024964 A1 | 1/2018 | Mao |
| 2018/0053313 A1 | 2/2018 | Smith |
| 2018/0054083 A1 | 2/2018 | Hick |
| 2018/0060269 A1 | 3/2018 | Kessler |
| 2018/0088648 A1* | 3/2018 | Otani ............... G06F 13/4282 |
| 2018/0098201 A1 | 4/2018 | Torello |
| 2018/0102604 A1 | 4/2018 | Keith |
| 2018/0123360 A1 | 5/2018 | Eaves |
| 2018/0159430 A1 | 6/2018 | Albert |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec |
| 2019/0267804 A1 | 8/2019 | Matan et al. |
| 2019/0280895 A1 | 9/2019 | Mather et al. |
| 2020/0228001 A1 | 7/2020 | Lambert et al. |
| 2020/0233472 A1 | 7/2020 | Jones et al. |
| 2020/0295955 A1 | 9/2020 | O'Brien et al. |
| 2022/0190587 A1 | 6/2022 | Eaves et al. |

FOREIGN PATENT DOCUMENTS

| | | |
|---|---|---|
| CN | 104412541 A | 3/2015 |
| CN | 204836199 U | 12/2015 |
| CN | 205544597 | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2693688 A1 | 2/2014 |
| EP | 3759869 | 1/2021 |
| EP | 3766208 | 1/2021 |
| EP | 3777051 A1 | 2/2021 |
| EP | 3788743 | 3/2021 |
| JP | S62232608 | 10/1987 |
| JP | 2001177031 | 6/2001 |
| JP | 2009058547 | 3/2009 |
| JP | 2009106127 | 5/2009 |
| JP | 2016533652 | 10/2016 |
| WO | WO199316407 A1 | 8/1993 |
| WO | 2006127916 A2 | 11/2006 |
| WO | WO2010053542 | 5/2010 |
| WO | WO2017054030 | 4/2017 |
| WO | WO2017167926 A1 | 10/2017 |
| WO | WO2018017544 A1 | 1/2018 |
| WO | WO2019023731 A1 | 2/2019 |
| WO | 2019055318 A1 | 3/2019 |

OTHER PUBLICATIONS

English Translation of Office Action in counterpart Chinese Application No. 201880059993.6, dated Sep. 23, 2022, 7 pages.

https://www.fischerconnectors.com/us/en/products/fiberoptic.

http://www.strantech.com/products/tfoca-genx-hybrid-2x2-fiber-optic-copper-connector/.

http://www.qpcfiber.com/product/connectors/e-link-hybrid-connector/.

https://www.lumentum.com/sites/default/files/technical-library-items/poweroverfiber-tn-pv-ae_0.pdf.

"Network Remote Power Using Packet Energy Transfer", Eaves et al., www.voltserver.com, Sep. 2012.

Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.

Implementation Guide, "Virtual Chassis Technology Best Practices", Juniper Networks, 8010018-009-EN, Jan. 2016, https://wwwjuniper.net/us/en/local/pdf/implementation-guides/8010018-en.pdf, 29 pages.

Yencheck, Thermal Modeling of Portable Power Cables, 1993.

Zhang, Machine Learning-Based Temperature Prediction for Runtime Thermal Management across System Components, Mar. 2016.

Data Center Power Equipment Thermal Guidelines and Best Practices.

Dynamic Thermal Rating of Substation Terminal Equipment by Rambabu Adapa, 2004.

Chen, Real-Time Termperature Estimation for Power MOSEFETs Conidering Thermal Aging Effects:, IEEE Trnasactions on Device and Materials Reliability, vol. 14, No. 1, Mar. 2014.

Petition for Post Grant Review of U.S. Pat. No. 10,735,105 [Public], filed Feb. 16, 2021, PGR 2021-00055.

Petition for Post Grant Review of U.S. Pat. No. 10,735,105 [Public], filed Feb. 16, 2021, PGR 2021-00056.

Eaves, S. S., Network Remote Powering Using Packet Energy Transfer, Proceedings of IEEE International Conference on Tele-

(56) References Cited

OTHER PUBLICATIONS communications Energy (INTELEC) 2012, Scottsdale, AZ, Sep. 30-Oct. 4, 2012 (IEEE 2012) (EavesIEEE).
Edelstein S., Updated 2016 Tesla Model S also gets new 75-kWh battery option, (Jun. 19, 2016), archived Jun. 19, 2016 by Internet Archive Wayback machine at https://web.archive.org/web/20160619001148/https://www.greencarreports.com/news/1103 782_updated-2016-tesla-model-s-also-gets-new-7 5-kwh-battery-option ("Edelstein").
NFPA 70 National Electrical Code, 2017 Edition (NEC).
International Standard IEC 62368-1 Edition 2.0 (2014), ISBN 978-2-8322-1405-3 ("IEC-62368").
International Standard IEC/TS 60479-1 Edition 4.0 (2005), ISBN 2-8318-8096-3 ("IEC-60479").
International Standard IEC 60950-1 Edition 2.2 (2013), ISBN 978-2-8322-0820-5 ("IEC-60950").
International Standard IEC 60947-1 Edition 5.0 (2014), ISBN 978-2-8322-1798-6 ("IEC-60947").
Tanenbaum, A. S., Computer Networks, Third Edition (1996) ("Tanenbaum").
Stallings, W., Data and Computer Communications, Fourth Edition (1994) ("Stallings").
Alexander, C. K., Fundamentals of Electric Circuits, Indian Edition (2013) ("Alexander").
Hall, S. H., High-Speed Digital System Design, A Handbook of Interconnect Theory and Design Practices (2000) ("Hall").
Sedra, A. S., Microelectronic Circuits, Seventh Edition (2014) ("Sedra").
Lathi, B. P., Modern Digital and Analog Communication Systems, Fourth Edition (2009) ("Lathi").
Understanding 802.3at PoE Plus Standard Increases Available Power (Jun. 2011) ("Microsemi").
English Translation of Office Action in counterpart Chinese Application No. 201880059993.6, dated Jun. 17, 2021, 14 pages.
First Examination Report in counterpart Indian Application No. 202047005685, dated Aug. 3, 2021, 6 pages.
Office Action in counterpart Chinese Application No. 201880059993.6, dated Dec. 17, 2021, 28 pages.
*Voltserver Inc.*, v. *Cisco Technology, Inc.*, "Decision Denying Institution of Post-Grant Review," United States Patent and Trademark Office, PGR2021-00055, U.S. Pat. No. 10,735,105 B2, Aug. 19, 2021, 25 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.
"Effects of current on human beings and livestok—Part 1: General aspects," Technical Specification, Basic Safety Publication, IEC/TS 60479-1, Edition 4.0, Jul. 2005, 122 pages.
"Information technology equipment—Safety—Part 1: General requirements," International Standard, IEC 60950-1, Edition 2.2, May 2013, pp. 1-61, 63 pages.
"Information technology equipment—Safety—Part 1: General requirements," International Standard, IEC 60950-1, dition 2.2, May 2013, pp. 62-122, 61 pages.
"Information technology equipment—Safety—Part 1: General requirements," International Standard, IEC 60950-1, Edition 2.2, May 2013, pp. 123-181, 59 pages.
"Information technology equipment—Safety—Part 1: General requirements," International Standard, IEC 60950-1, Edition 2.2, May 2013, pp. 182-253, 72 pages.
"Information technology equipment—Safety—Part 1: General requirements," International Standard, IEC 60950-1, Edition 2.2, May 2013, pp. 254-319, 66 pages.
"Information technology equipment—Safety—Part 1: General requirements," International Standard, IEC 60950-1, Edition 2.2, May 2013, pp. 320-377, 58 pages.
"Information technology equipment—Safety—Part 1: General requirements," International Standard, IEC 60950-1, Edition 2.2, May 2013, pp. 378-433, 56 pages.
"Information technology equipment—Safety—Part 1: General requirements," International Standard, IEC 60950-1, Edition 2.2, May 2013, pp. 434-490, 57 pages.
"Information technology equipment—Safety—Part 1: General requirements," International Standard, IEC 60950-1, Edition 2.2, May 2013, pp. 491-551, 61 pages.
"Information technology equipment—Safety—Part 1: General requirements," International Standard, IEC 60950-1, Edition 2.2, May 2013, pp. 552-622, 71 pages.
"Information technology equipment—Safety—Part 1: General requirements," International Standard, IEC 60950-1, Edition 2.2, May 2013, pp. 623-644, 24 pages.
"Low-voltage switchgear and controlgear—Part 1: General rules," International Standard, Amendment 2, IEC 60947-1, Edition 5.0, Sep. 2014, pp. 1-63, 65 pages.
"Low-voltage switchgear and controlgear—Part 1: General rules," International Standard, Amendment 2, IEC 60947-1, dition 5.0, Sep. 2014, pp. 64-102, 41 pages.
Stephen Edelstein, "Updated 2016 Tesla Model S also gets new 75-kWh battery option," Internet Archive WayBack Machine, Green Car Reports, May 5, 2016, 3 pages.
Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.
"Audio/video, information and communication technology equipment—Part 1: Safety requirements," International Standard, IEC 62368-1, Edition 2.0, Feb. 2014, pp. 1-132, 134 pages.
"Audio/video, information and communication technology equipment—Part 1: Safety requirements," International Standard, IEC 62368-1, Edition 2.0, Feb. 2014, pp. 133-263, 131 pages.
"Audio/video, information and communication technology equipment—Part 1: Safety requirements," International Standard, IEC 62368-1, Edition 2.0, Feb. 2014, pp. 264-387, 124 pages.
"Audio/video, information and communication technology equipment—Part 1: Safety requirements," International Standard, IEC 62368-1, Edition 2.0, Feb. 2014, pp. 388-508, 121 pages.
"Audio/video, information and communication technology equipment—Part 1: Safety requirements," International Standard, IEC 62368-1, Edition 2.0, Feb. 2014, pp. 509-593, 85 pages.
"Audio/video, information and communication technology equipment—Part 1: Safety requirements," International Standard, IEC 62368-1, Edition 2.0, Feb. 2014, pp. 594-676, 85 pages.
"National Electrical Code," National Fire Protection Association (NFPA) 70, 2017, 881 pages.
*Voltserver Inc.*, v. *Cisco Technology, Inc.*, "Declaration of David A. Durfee, Ph.D.," United States Patent and Trademark Office, PGR2021-00055, U.S. Pat. No. 10,735,105, Feb. 16, 2021, 340 pages.
David A. Durfee Ph.D., "Curriculum Vitae," 4 pages.
Adel S. Sedra, "Microelectronic Circuits," Sedra/Smith, Oxford University Press, Seventh Edition, 2015, 38 pages.
Charles k. Alexander, et al., "Fundamentals of Electric Circuits," McGraw Hill Education, Indian Edition 5e, 2013, 37 pages.
Andrew S. Tanenbaum, "Computer Networks," Prentice Hall PTR, Third Edition, 1996, 12 pages.
William Stallings, "Data and Computer Communications," Macmillan Publishing Company, Fourth Edition, 1994, 14 pages.
B.P. Lathi, et al., "Modern Digital and Analog Communication Systems," Oxford University Press, Fourth Edition, 2009, 15 pages.
*Voltserver Inc.*, v. *Cisco Technology, Inc.*, "Petition for Post Grant Review of U.S. Pat. No. 10,735,105," United States Patent and Trademark Office, PGR2021-00055, U.S. Pat. No. 10,735,105, Feb. 16, 2021, 132 pages.
Stephen H. Hall, et al., "High-Speed Digital System Design: A handbook of Interconnect Theory and Design Practices,", John Wiley & Sons, Inc., 2000, 55 pages.
"Understanding 802.3at, PoE Plus Standard Increases Available Power," Microsemi, Jun. 2011, 7 pages.
"Digital Electricity Gen2 Detailed Installation Manual," Voltserver Digital Electricity, Rev B.1, Nov. 29, 2017, 68 pages.

(56) References Cited

OTHER PUBLICATIONS

Berkeley Lab ETA, "Touch-Safe, High Voltage Digital Electricity Transmission using Packet Energy Transfer," Vimeo, https://vimeo.com/172469008, Mar. 8, 2016, 8 pages.
*Voltserver Inc.*, v. *Cisco Technology, Inc.*, "Decision Denying Institution of Post-Grant Review," United States Patent and Trademark Office, PGR2021-00056, U.S. Pat. No. 10,735,105 B2, Aug. 23, 2021, 18 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.
"Electrical—Computer Conference Proceedings," Internet Archive WayBack Machine Search for Intelec 2012, Curran Associates, Inc., http://www.proceedings.com/electrical-computer-proceedings.html, 2012, 125 pages.
"Part VII: A Summary of Commonly Used MARC 21 Fields," Marc, Understanding MARC, https://www.loc.gov/marc//umb/um07to10.html, retrieved from Internet Feb. 13, 2021, 17 pages.
LC Catalog-Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibId=11348322, retrieved from the Internet Feb. 12, 2021, 3 pages.
*Voltserver Inc.*, v. *Cisco Technology, Inc.*, "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchId=3810&recPointer=0&recCount=25&searchType=1&bibId=11348322, retrieved rom the Internet Feb. 12, 2021, 4 pages.
Chen J., et al., "Buck-boost PWM Converters having Two Independently Controlled Switches," 32nd Annual EEE Power Electronics Specialists Conference, Conference Proceedings, Vancouver, Canada, New York, NY: IEEE, US, Jun. 17-21, 2001, vol. 2, pp. 736-741, DOI: 10.1109/PESC.2001.954206, ISBN 978-0-7803-7067-8 paragraph SectionIli, XP010559317.
Cheng K.W.E., et al., "Constant Frequency, Two-Stage Quasiresonant Convertor," Published in: IEE Proceedings B—Electric Power Applications, May 1, 1992, vol. 139, No. 3, pp. 227-237, 1271980 1, XP000292493,the whole document.
International Preliminary Report on Patentability for International Application No. PCT/US2018/050055, dated Apr. 2, 2020, 9 Pages.
International Search Report and Written Opinion for International Application No. PCT/US2018/050055, dated Nov. 26, 2018, 12 Pages.

\* cited by examiner

POWER DELIVERY THROUGH AN OPTICAL SYSTEM

STATEMENT OF RELATED APPLICATIONS

The present application is a divisional application of U.S. patent application Ser. No. 16/601,153, entitled POWER DELIVERY THROUGH AN OPTICAL SYSTEM, filed Oct. 14, 2019, which is a continuation of U.S. patent application Ser. No. 15/707,976, entitled POWER DELIVERY THROUGH AN OPTICAL SYSTEM, filed Sep. 18, 2017, and issued as U.S. Pat. No. 10,541,758, which are hereby incorporated by reference in their entireties.

TECHNICAL FIELD

The present disclosure relates generally to communications networks, and more particularly, to power delivery in a communications network.

BACKGROUND

Power over Ethernet (PoE) is a technology for providing electrical power over a wired telecommunications network from power sourcing equipment (PSE) to a powered device (PD) over a link section. In conventional PoE systems, power is delivered over the cables used by the data over a range from a few meters to about one hundred meters. When a greater distance is needed or fiber optic cables are used, power must be supplied through a local power source such as a wall outlet due to limitations with conventional PoE. Furthermore, today's PoE systems have limited power capacity, which may be inadequate for many classes of devices.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
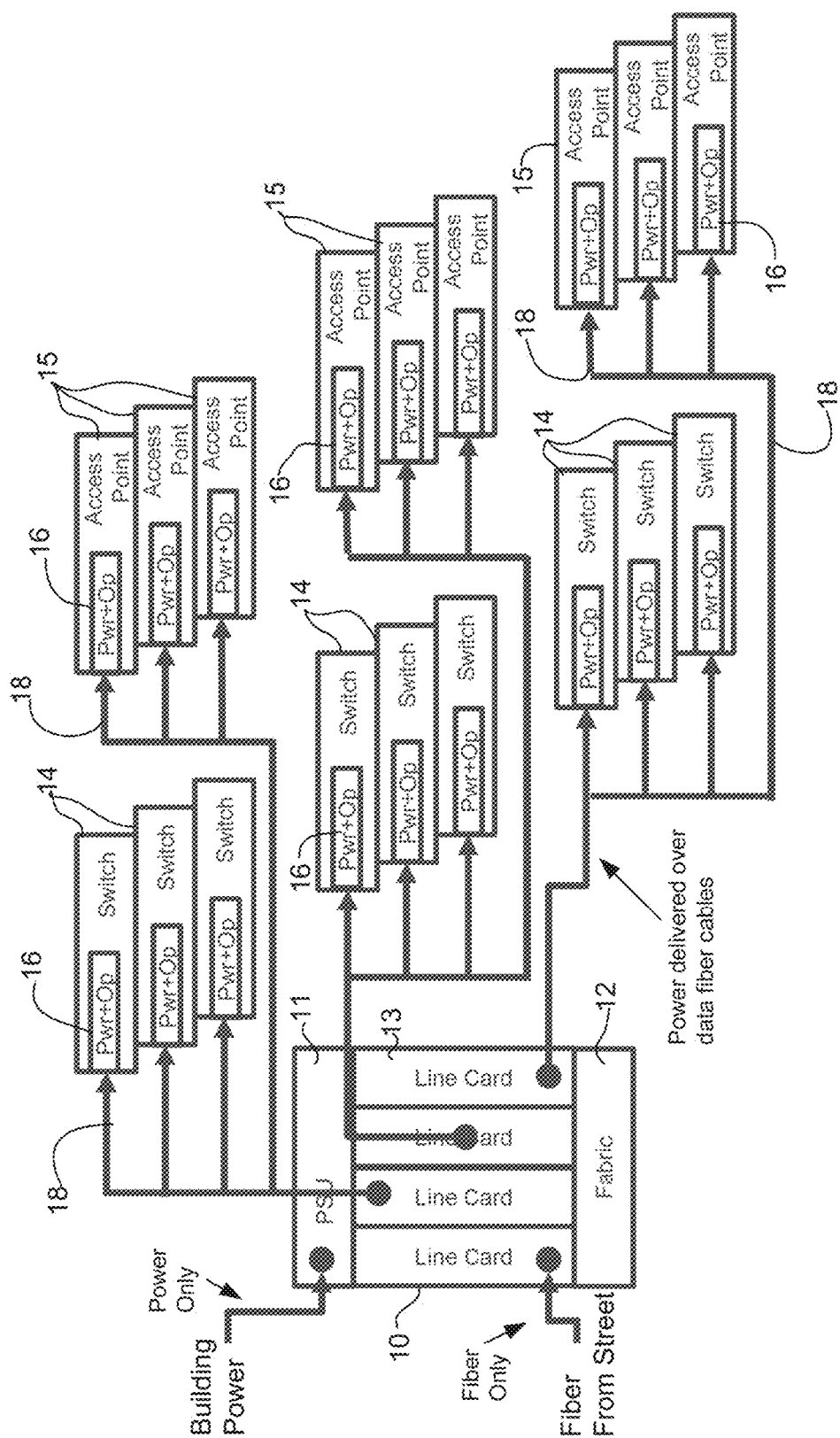
FIG. 1 illustrates an example of a network in which embodiments described herein may be implemented.

In one embodiment, a method generally comprises receiving power delivered over a data fiber cable at an optical transceiver installed at a network communications device and transmitting data and the power from the optical transceiver to the network communications device. The network communications device is powered by the power received from the optical transceiver.

In another embodiment, an apparatus generally comprises an optical interface for receiving optical signals on an optical fiber in a fiber and power cable at an optical transceiver, an electrical interface for receiving power on an electrical wire in the fiber and power cable at the optical transceiver, an optical component for converting the optical signals to electrical signals, and a power component for detecting and monitoring the power at the optical transceiver and providing the power to a network communications device.

In yet another embodiment, an apparatus generally comprises an optical transceiver comprising an optical interface for transmitting optical signals on an optical fiber in a fiber and power cable and an electrical interface for transmitting power on an electrical wire in the fiber and power cable, and a power supply unit for receiving the power external from a communications network and providing the power to the optical transceiver for transmission in the communications network.

In another embodiment, a method generally comprises transmitting power over a data fiber cable from an optical transceiver installed at a network device and transmitting data on the data fiber cable from the optical transceiver. The power and the data are transmitted over a communications network and received at network communications devices powered by the received power.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In conventional Power over Ethernet (PoE) systems used to simultaneously transmit power and data communications, power is delivered over the same twisted pair cable used for data. These systems are limited in range to a few meters to about 100 meters. Furthermore, the maximum power delivery capacity of standard PoE is approximately 100 Watts, but many classes of powered devices would benefit from power delivery of 1000 Watts or more. When a larger distance is needed, fiber optic cabling is used, or larger power delivery ratings are needed, power needs to be supplied to the device through a local power source.

The embodiments described herein provide power delivery through an optical transceiver by supplying power integrated with fiber cabling over the same fiber/optical transceiver system so that power may be supplied at greater distances (e.g., up to 10 km), in greater quantity (e.g., up to several kilowatts), and may be provided in locations where local power is difficult to deliver. By incorporating power in the fiber cable and delivering from a building entrance, power does not need to be supplied throughout a data center room and a full zoned system may be deployed without building out a data room. The embodiments effectively deliver communications and power on a large enough scale that equipment in a data room can entirely be powered from an equipment/premise entrance point of the building. Thus, electrical power distribution equipment may be removed from the floor data room and switches, routers, access points, lighting systems, and other electronic devices or equipment may be placed outside of the 100 m range of traditional PoE systems. Through a combination of PoE or pulsed power with a modified optical transceiver and connector system, power can be delivered to equipment in a zone, data room on a floor, or an access point anywhere in the building.

Internet of Things (IoT) applications like remote sensors/actuators and fog computing can also take advantage of the greater reach and power delivery capacity of this system. With an extended reach (e.g., one to ten km), all power to communications equipment throughout a building or across a neighborhood can be delivered from one source, along with the communications link for the equipment, thereby providing a user with complete control of the location of communications equipment without the 100 m limitation of traditional PoE. As described in detail below, one or more embodiments may be used to deliver power to and from a network (e.g., switch/router) system using an optical transceiver and fiber connector system modified to incorporate electrical wires to deliver power through the optical transceiver and to powered devices. The system is referred to herein as PoE+Fiber (PoE+F).

Referring now to the drawings, and first to FIG. 1, an example of a network in which embodiments described herein may be implemented is shown. For simplification, only a small number of nodes are shown. The embodiments operate in the context of a data communications network including multiple network devices. The network may include any number of network devices in communication via any number of nodes (e.g., routers, switches, gateways, controllers, access points, or other network devices), which facilitate passage of data within the network. The network devices may communicate over or be in communication with one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet of Things (IoT), Internet, intranet, or any other network).

The network is configured to pass electrical power along with optical data to provide both data connectivity and electric power to network devices such as switches, routers, access points, or other electronic components and devices. Signals may be exchanged among communications equipment and power transmitted from power sourcing equipment to powered devices. As described in detail below, the PoE+F system delivers power to and from a network (e.g., switch/router system) using an optical transceiver (optical module) configured to receive and transmit both data and electrical power, and a cabling system comprising both optical fibers and electrical wires (e.g., copper wires).

As shown in the example of FIG. 1, the PoE+F system uses building power supplied to a network device 10, which may be located in a premise/entry room, for example. The power may be transmitted from the building entry point to end points, which may be located at distances greater than 100 meters (e.g., 1 km, 10 km, or any other distance), and/or at greater power levels than 100 Watts (e.g., 250 Watts, 1000 Watts or any other power level). In one or more embodiments, there is no need for additional electrical wiring for the communications network and all of the network communications devices 14, 15 operate using the power provided by the PoE+F system, delivered through an optical transceiver 16 operable to receive and transmit both fiber optics data and power.

The network device 10 comprises a power supply unit (PSU) 11 for receiving power (e.g., building power), a fabric 12, and a plurality of line cards 13. In the example shown in FIG. 1, one of the line cards receives fiber from outside of the building (e.g., from street or other location) and the other line cards implement PoE+F. The network device 10 is operable to provide high capacity power from an internal power system (e.g., PSU providing over and including 5 kW (e.g., 10 kW, 12 kW, 14 kW, 16 kW), or PSU providing over and including 100 W (e.g., 500 W, 1 kW) of useable power or any other suitable power capacity). The PSU 11 may provide, for example, PoE, pulsed power, or AC power. As described in detail below, the network device 10 is operable to receive power external from a communications network and transmit the power over data fiber cables 18 in the communications network (e.g., network comprising central hub 10 (PSE) and a plurality of network devices 14, 15 (PDs). The network device 10 may comprise, for example, a router or convergence device (e.g., Network Convergence System (NCS) 4000 series available from Cisco Systems, Inc.) or any other suitable line card system. It is to be understood that this is only an example and any other network device operable to transmit power and optical data may be used. One or more of the line cards 13 may also include an optical transceiver module 16 operable to transmit power and data on the cables 18.

The network may include any number or arrangement of network communications devices (e.g., switches 14, access points 15, routers, or other devices operable to route (switch, forward) data communications). In one example each group of access points 15 is located on a different floor or zone. One or more network devices 14, 15 may also deliver power to equipment using PoE, as described below with respect to FIGS. 3 and 4. For example, one or more of the network devices 14, 15 may deliver power using PoE to electronic components such as IP (Internet Protocol) cameras, VoIP (Voice over IP) phones, video cameras, point-of-sale devices, security access control devices, residential devices, building automation devices, industrial automation, factory equipment, lights (building lights, streetlights), traffic signals, and many other electrical components and devices.

Cables 18 extending from the network device 10 to the switches 14 and access points 15 are configured to transmit power over data fiber cabling and include both optical fibers and electrical wires. In one example, the cables 18 comprise two copper wires and two fibers. The cables 18 may be formed from any material suitable to carry both electrical power and optical data (e.g., copper, fiber) and may carry any number of electrical wires and optical fibers in any arrangement. As described below with respect to FIGS. 15-18, the cables 18 may also include cooling.

The optical transceivers (optical module, optical device, optics module, transceiver, silicon photonics optical transceiver) 16 are configured to source or receive power, as described in detail below. The transceiver modules 16 operate as an engine that bidirectionally converts optical signals to electrical signals or in general as an interface to the network element copper wire or optical fiber.

In one or more embodiments, the optical transceiver 16 may be a pluggable transceiver module in any form factor (e.g., SFP (Small Form-Factor Pluggable), QSFP (Quad Small Form-Factor Pluggable), CFP (C Form-Factor Pluggable), and the like), and may support data rates up to 400 Gbps, for example. Hosts for these pluggable optical modules include line cards on the switches 14, access points 15, or other network devices. One or more of the line cards 13 in network device 10 may also host optical modules. The host may include a printed circuit board (PCB) and electronic components and circuits operable to interface telecommunications lines in a telecommunications network. The host may be configured to perform one or more operations and receive any number or type of pluggable transceiver modules configured for transmitting and receiving signals.

The optical transceiver 16 may also be configured for operation with AOC (Active Optical Cable) and form factors used in UWB (Ultra-Wideband) applications, including for example, Ultra HDMI (High-Definition Multimedia Interface), serial high bandwidth cables (e.g., thunderbolt), and other form factors.

Also, it may be noted that the optical transceivers 16 may be configured for operation in point-to-multipoint or multi-point-to-point topology. For example, QFSP may breakout to SFP+. One or more embodiments may be configured to allow for load shifting.

As described in detail below, the optical transceiver 16 is modified along with a fiber connector system to incorporate copper wires to deliver power through the optical transceiver to the powered devices 14, 15 for use by the network communications devices. The optical transceiver 16 provides for power to be delivered to the switches 14 and access points 15 in locations where standard power is not available. As described further below, the optical transceiver 16 may be configured to tap some of the energy and make intelligent decisions so that the power source 10 knows when it is safe to increase power on the wires without damaging the system or endangering an operator.

In one embodiment, one or more network devices may comprise dual-role power ports that may be selectively configurable to operate as a PSE (Power Source Equipment) port to provide power to a connected device or as a PD (Powered Device) port to sink power from the connected device, and enable the reversal of energy flow under system control, as described in U.S. Pat. No. 9,531,551 ("Dynamically Configurable Power-Over-Ethernet Apparatus and Method", issued Dec. 27, 2016), for example. The dual-role power ports may be PoE or PoE+F ports, for example.

In addition to the network devices 14, 15 comprising optical transceivers 16 operable to receive and transmit power over electrical wires and optical data over fibers, the network may also include one or more network devices comprising conventional optical modules that only process and transmit the optical data. These network devices would receive electrical power from a local power source such as a wall outlet. Similarly, specialized variants of transceivers 16 could eliminate the optical data interfaces, and only interconnect power (perhaps moving data interconnection to wireless networks).

Figure 2:
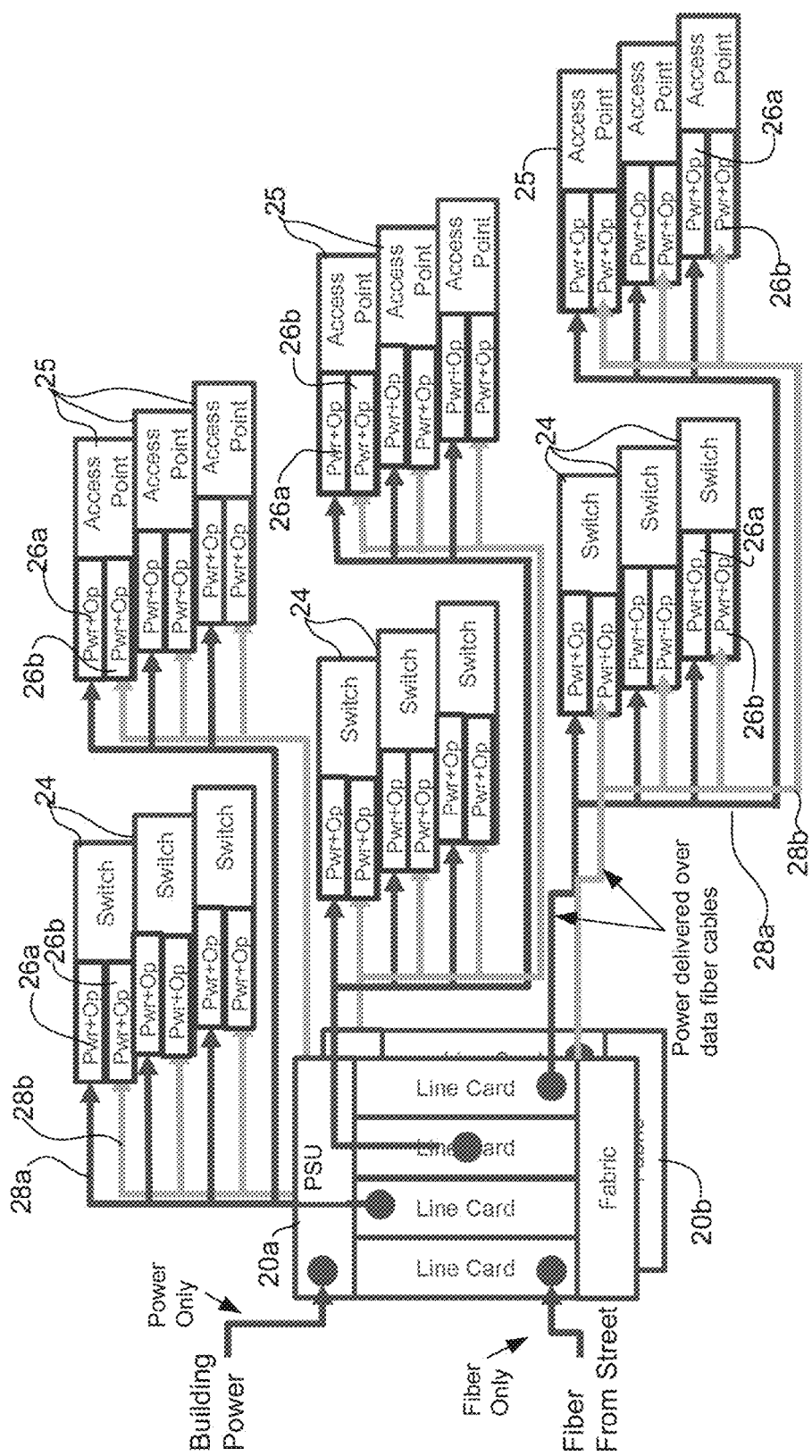
FIG. 2 illustrates an example of the network of FIG. 1 with redundant data and power.

FIG. 2 illustrates an example of a redundant data and power PoE+F system. The network includes two redundant network devices 20a, 20b, which receive power and fiber at a premise entrance point, as previously described. Each network device 20a, 20b delivers power over data fiber cabling 28a, 28b, respectively, to the switches 24 and access points 25. Each switch 24 and access point 25 comprises two optical transceivers 26a, 26b for receiving data and power from network devices 20a, 20b, respectively. The network shown in the example of FIG. 2 may provide backup data and power in the case of failure of any single cable 28a, 28b, or either network device 20a, 20b, or provide additional power or bandwidth as needed in the network. In one example, a plurality of switches 24 and access points 25 may provide power and data to a first circuit and another group of switches and access points may provide power and data to a second circuit. Both circuits may be used to provide power to an equipment power circuit, for example, to provide higher service availability.

Figure 3:
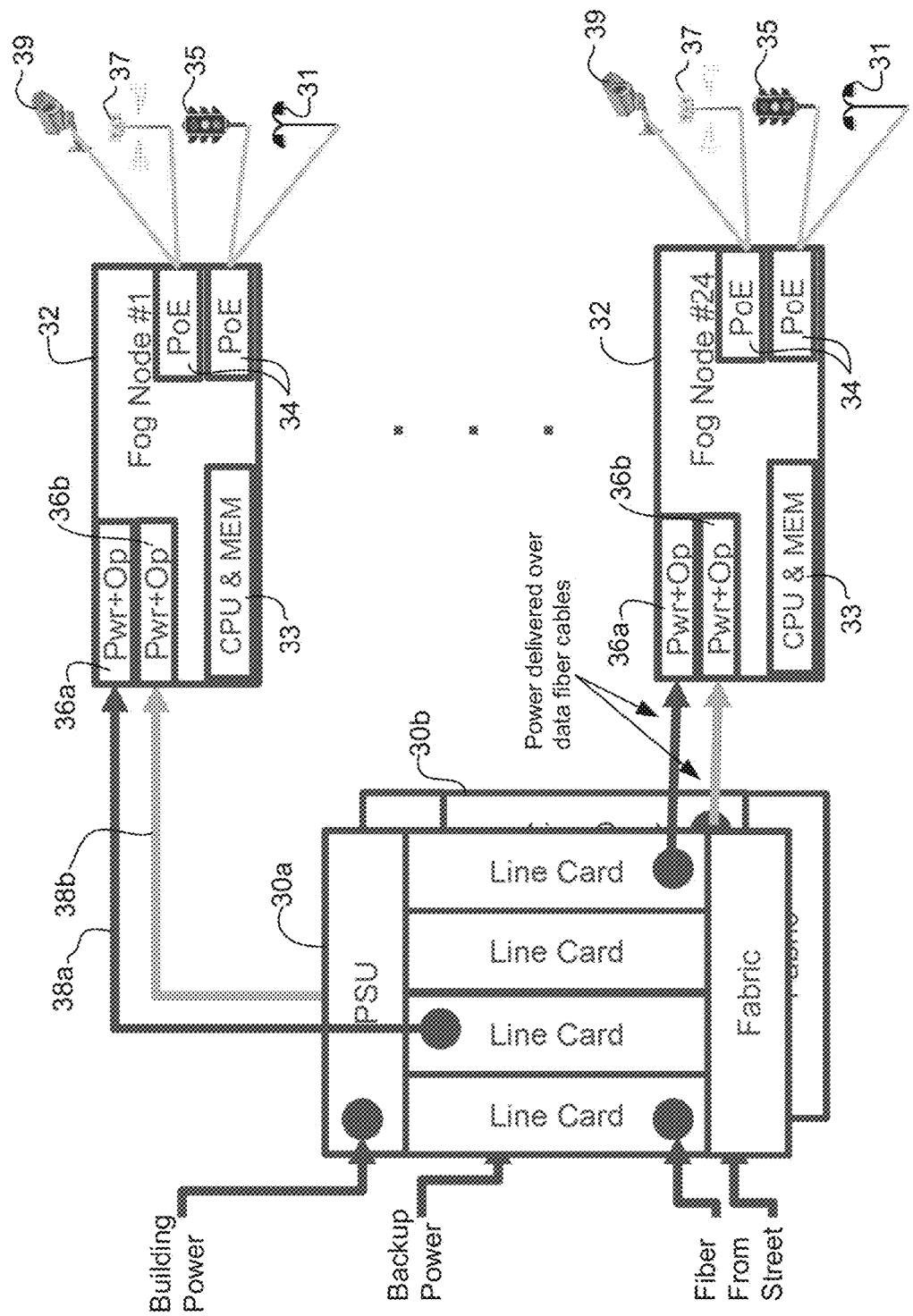
FIG. 3 illustrates an example of fog node deployment with the network of FIG. 2.

FIG. 3 illustrates an example of PoE+F in a fog node deployment, in accordance with one embodiment. Fog is an IoT technique where computation, networking, and storage are moved from the cloud to locations much closer to the IoT sensors and actuators. In the example shown in FIG. 3, power is delivered over data fiber cables 38a, 38b connected to optical transceivers 36a, 36b. Each network device 30a, 30b provides power delivered over data fiber cabling 38a, 38b to any number of fog nodes 32. In one example, power may be delivered over data fiber cabling to provide approximately 600 W output to each of the twenty-four fog nodes 32. Each fog node 32 comprises processing and memory 33 and one or more PoE modules 34 operable to power one or more PoE devices. For example, each fog node 32 may provide approximately 500 W of power to PoE devices such as streetlights 31, traffic signals 35, 5G cells, access points, base stations 37, video cameras 39, or any other electronic device serving a smart building or smart city.

Figure 4:
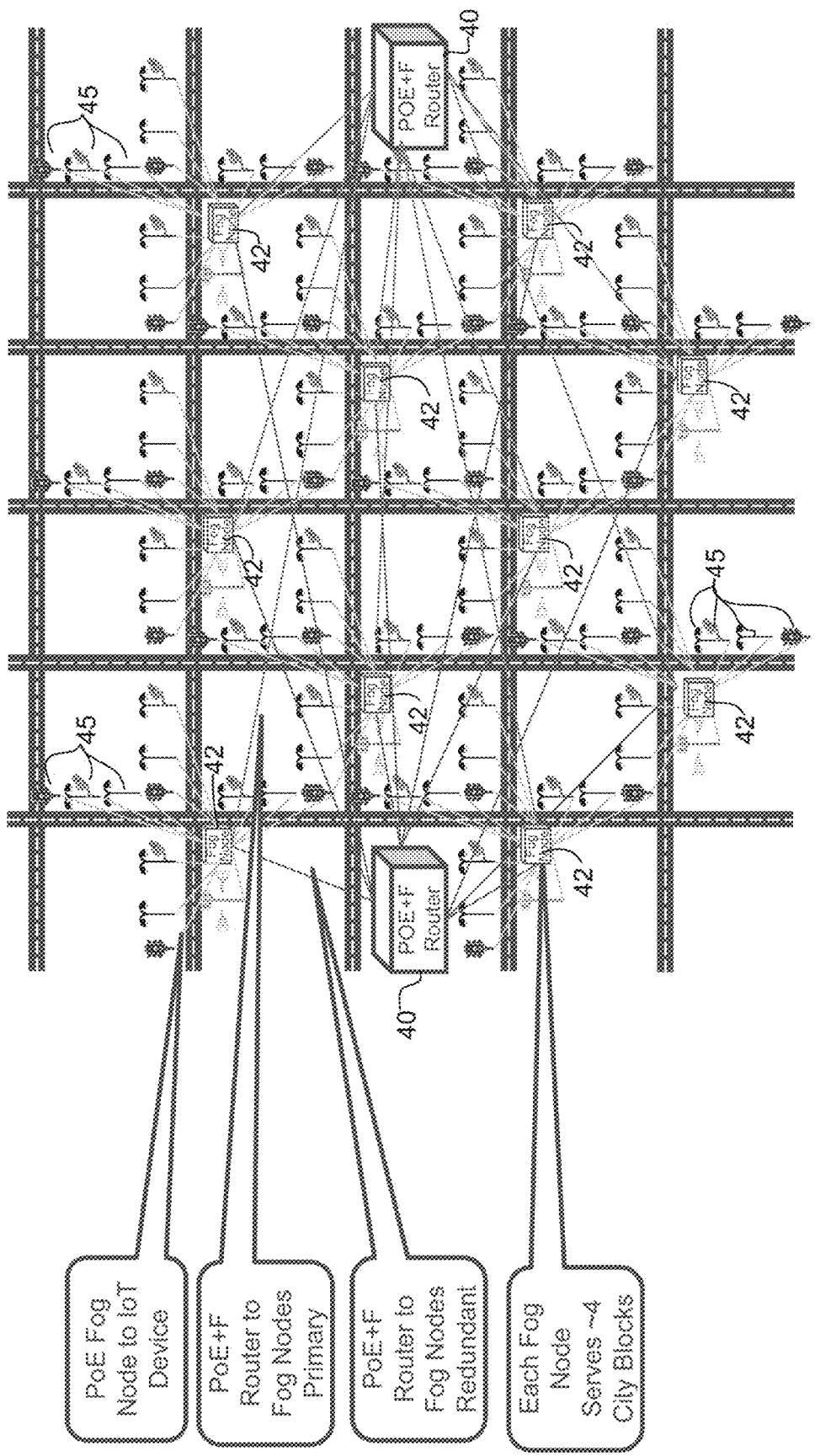
FIG. 4 illustrates an example of smart city fog deployment with the network of FIG. 3.

FIG. 4 illustrates an example of smart city fog deployment, in accordance with one embodiment. In this example, two PoE+F redundant routers 40 provide primary and backup (redundant) power and data to fog nodes 42. The fog nodes 42 provide power to one or more IoT (Internet of Things) devices 45 (e.g., 5G cells, APs, streetlights, traffic signals, video cameras, or other devices). In one example, each pair of routers 40 may serve approximately twenty-four fog nodes 42, covering approximately 100 city blocks or approximately 1 square km.

The PoE fog node arrangement shown in FIGS. 3 and 4 may also be used in a smart building (e.g., different fog node for each floor), smart factory (e.g., different fog node for each assembly cell), cruise ship, hotel, school, campus, hospital, shopping center, or any other environment.

It is to be understood that the network devices and topologies shown in FIGS. 1, 2, 3, and 4, and described above are only examples and the embodiments described herein may be implemented in networks comprising different network topologies or network devices, without departing from the scope of the embodiments. For example, the network may comprise any number or type of network communications devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 5:
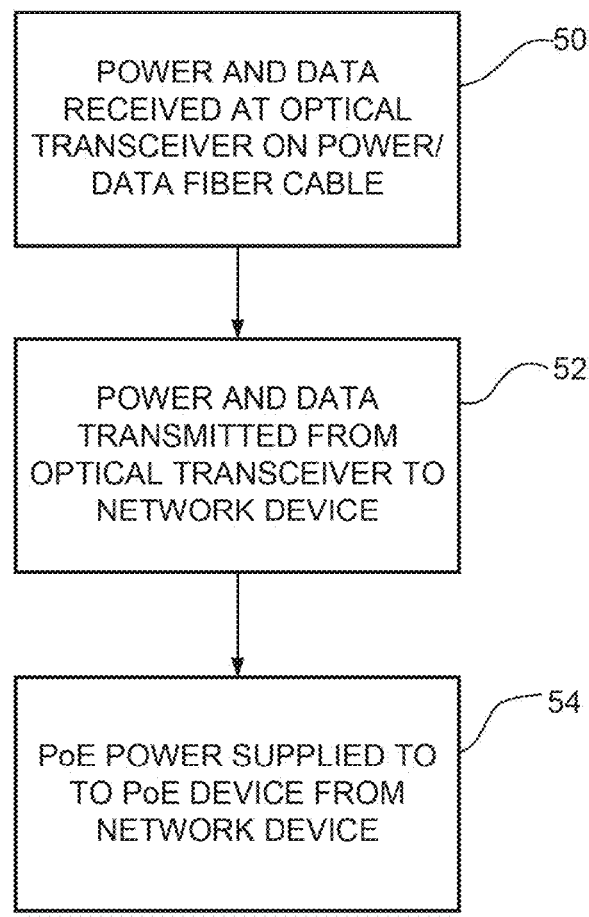
FIG. 5 is a flowchart illustrating an overview of a process for delivery of power and data in a Power over Ethernet (PoE)+Fiber system, in accordance with one embodiment.

FIG. 5 is a flowchart illustrating an overview of a process for delivering power and data through an optical transceiver system. At step 50, power and data are received at an optical transceiver 16 operating at a network device 14, wherein the power is delivered to the optical transceiver over data fiber cable 18 and received at a connector configured to transmit the power and data from the cable to the optical transceiver (FIG. 1). The optical transceiver 16 transmits power and data to the network device 14, which is powered by the power received at the optical transceiver (step 52) (FIGS. 1 and 5). In one or more embodiments, the network device may further transmit PoE to one or more PoE devices (e.g., lights, access points, streetlights, traffic signals, cameras, or other devices) (step 54).

It is to be understood that the process shown in FIG. 5 is only an example of a process for implementing PoE+F and that steps may be added, removed, combined, or modified, without departing from the scope of the embodiments. For example, an optical transceiver 16 at the central hub 10 is operable to transmit power received from the power supply unit 11 along with data on the power and fiber cable 18 (FIG. 1).

Figure 6:
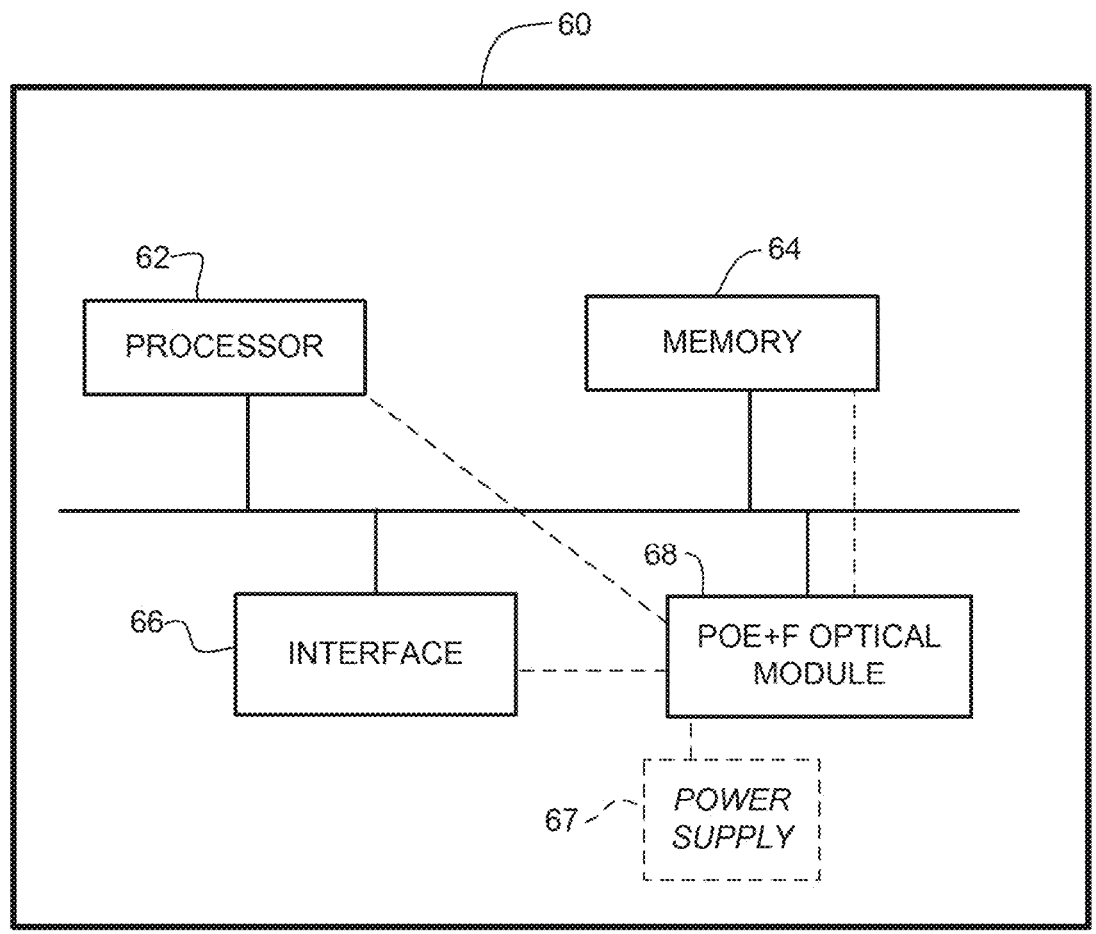
FIG. 6 depicts an example of a network device useful in implementing embodiments described herein.

FIG. 6 illustrates an example of a network device 60 (e.g., switch 14, access point 15, central hub 10 in FIG. 1) that may be used to implement the embodiments described herein. In one embodiment, the network device 60 is a programmable machine that may be implemented in hardware, software, or any combination thereof. The network device 60 includes one or more processors 62, memory 64, interface 66, and PoE+F optical module 68 (e.g., optical transceiver 16 in FIG. 1).

Memory 64 may be a volatile memory or non-volatile storage, which stores various applications, operating systems, modules, and data for execution and use by the processor 62. For example, components of the PoE+F optical module 68 (e.g., code, logic, or firmware, etc.) may be stored in the memory 64. The network device 60 may include any number of memory components.

The network device 60 may include any number of processors 62 (e.g., single or multi-processor computing device or system), which may communicate with a forwarding engine or packet forwarder operable to process a packet or packet header. The processor 62 may receive instructions from a software application or module, which causes the processor to perform functions of one or more embodiments described herein.

Logic may be encoded in one or more tangible media for execution by the processor 62. For example, the processor 62 may execute codes stored in a computer-readable medium such as memory 64. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described above with respect to the flowchart of FIG. 5 or other functions such as power level negotiations or safety subsystems described below. The network device 60 may include any number of processors 62.

The interface 66 may comprise any number of interfaces or network interfaces (line cards, ports, connectors) for receiving data or power, or transmitting data or power to other devices. The network interface may be configured to transmit or receive data using a variety of different communications protocols and may include mechanical, electrical, and signaling circuitry for communicating data over physical links coupled to the network or wireless interfaces. For example, line cards may include port processors and port processor controllers. The interface 66 may be configured for PoE+F, PoE, PoF, or similar operation.

The PoE+F optical module 68 may comprise one or more components of the optical transceiver 16 in FIG. 1 and may also include logic, firmware, software, etc. for use with a smart optical module shown in FIGS. 7 and 8 (described below). For example, the optical module 68 may comprise hardware or software for use in power detection, power monitor and control, or power enable/disable. The optical module 68 may further comprise one or more of the processor or memory components, or interface for receiving power and optical data from the cable 18 at a fiber connector, for delivering power and signal data to the network device, or transmitting control signals to the power source 10, for example (FIGS. 1 and 6). As previously described, power is supplied to the optical module by power supply 67 and the PoE+F optical module 68 provides power to the rest of the components at the network device 60.

It is to be understood that the network device 60 shown in FIG. 6 and described above is only an example and that different configurations of network devices may be used. For example, the network device 60 may further include any suitable combination of hardware, software, algorithms, processors, devices, components, or elements operable to facilitate the capabilities described herein.

Figure 7:
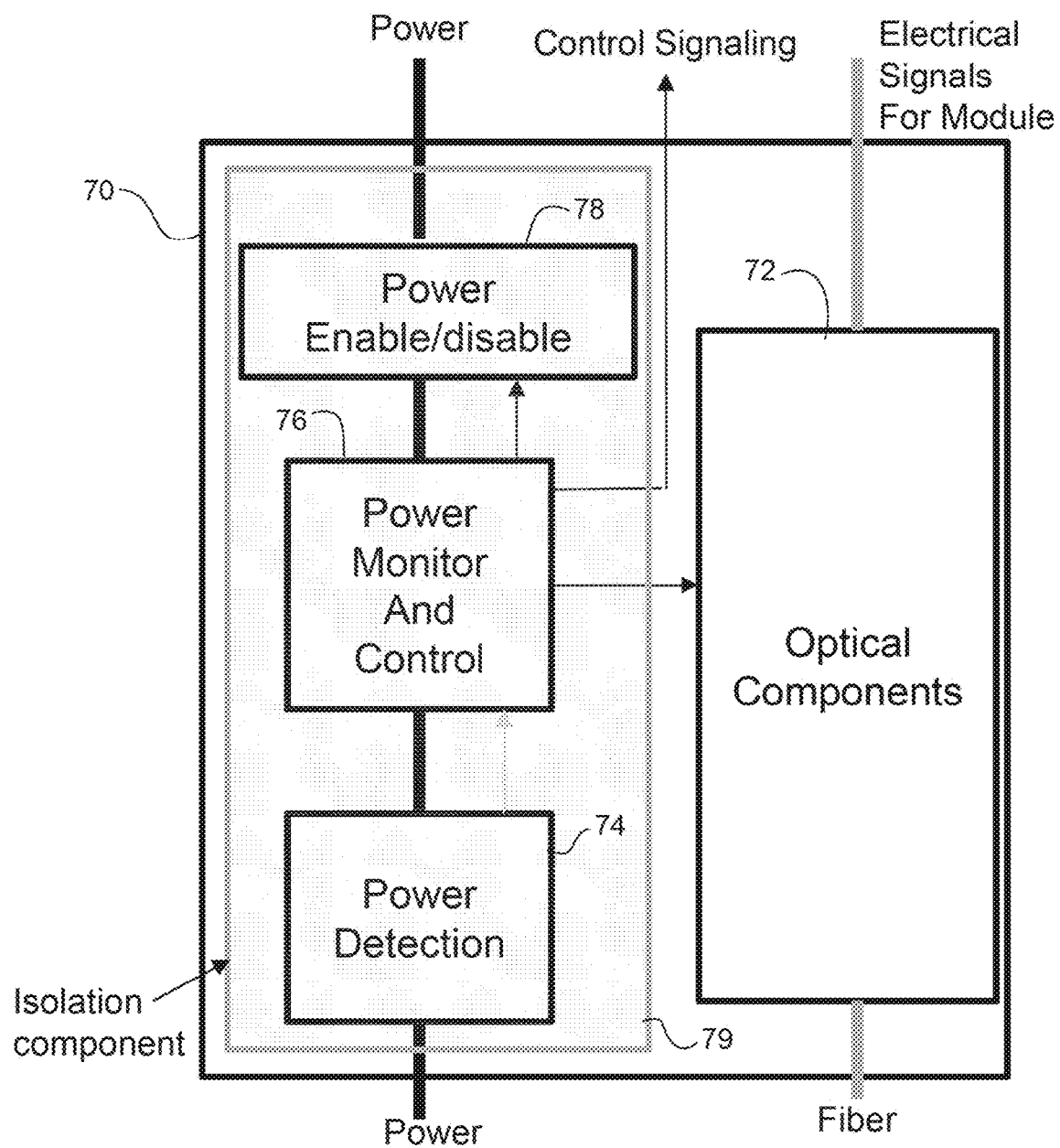
FIG. 7 is a block diagram of a smart optical module for use in the PoE+F system, in accordance with one embodiment.

FIG. 7 illustrates a smart optical transceiver 70, in accordance with one embodiment. The smart optical transceiver 70 provides for communication with the power source (e.g., network device 10 in FIG. 1) during power up of the powered device and may provide fault protection and detection. In one embodiment, the device 70 is configured to calculate available power and prevent the cabling system from being energized when it should not be powered. The optical device 70 includes optical components 72 for receiving optical data and converting it to electrical signals (or converting electrical signals to optical data) and power components including power detection module 74, power monitor and control unit 76, and power enable/disable module 78.

Pulsed power or advanced PoE driving voltages beyond 60V up to +/−450V, for example, may create electromagnetic interference with the optical circuitry 72. In one embodiment, the power components 74, 76, 78 are isolated from the optical components 72 via an isolation component 79 (e.g., isolation material or element). The isolation component 79 electromagnetically isolates the power circuit from the optical components 72 to prevent interference with operation of the optics.

The power detection module 74 is operable to detect power, energize the optical components 72, and return a message to the power source for fiber or the powered cabling. The return message may be provided via state changes on the power wires or over the optical channel. In one embodiment, the power is not enabled by the power enable/disable module 78 until the optical transceiver 70 and the source have determined that the device is properly connected and the network device to be powered is ready to be powered.

The power monitor and control device 76 continuously monitors power delivery to ensure that the system can support the needed power delivery, and no safety limits (voltage, current) are exceeded. The power monitor and control device 76 may also monitor optical signaling and disable power if there is a lack of optical transitions or communication with the power source.

Figure 8:
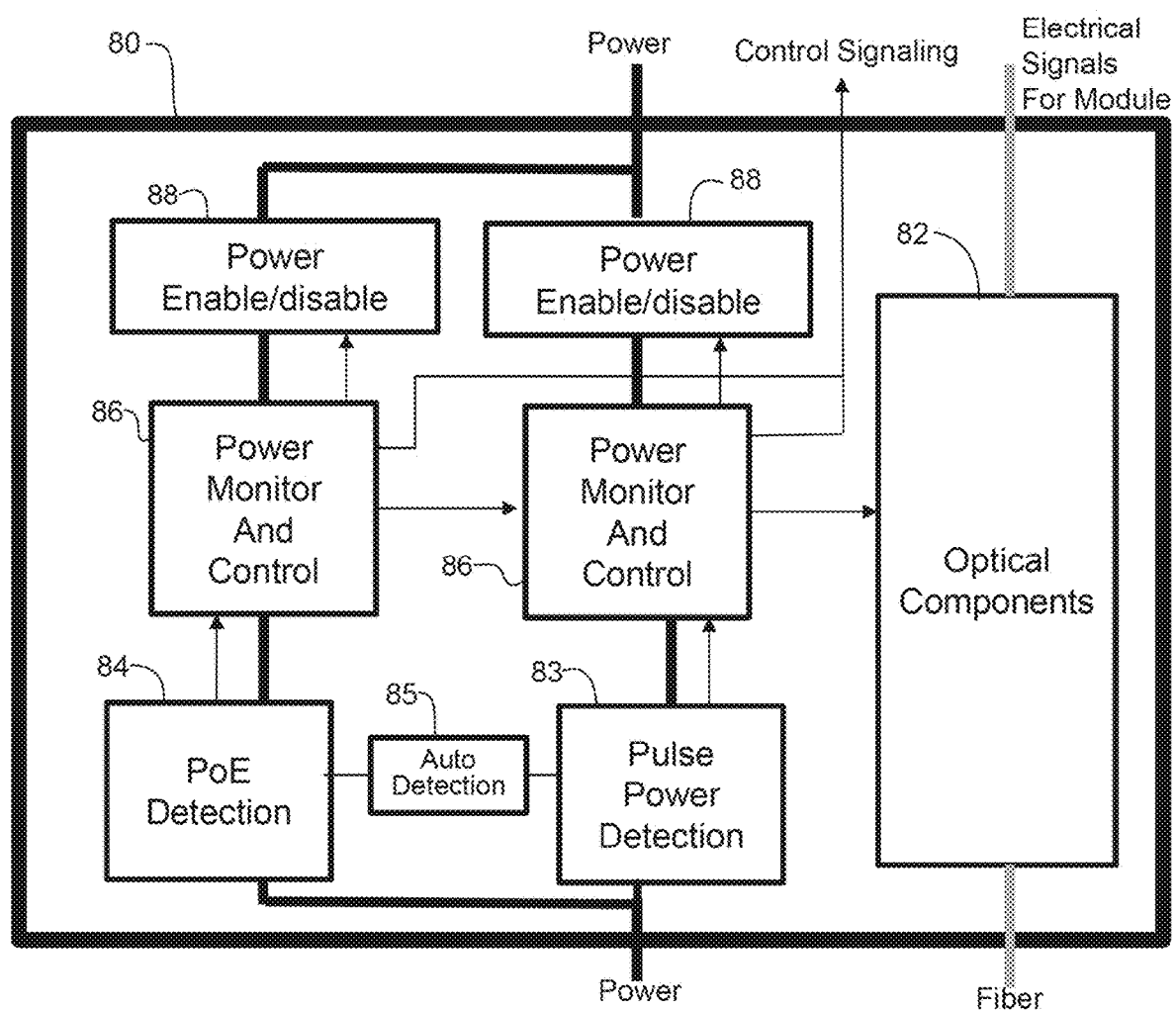
FIG. 8 is a block diagram of the smart optical module of FIG. 7 configured for auto power detection, in accordance with one embodiment.

FIG. 8 illustrates an example of the smart optical transceiver of FIG. 7 with auto power negotiation for PoE or pulsed power, in accordance with one embodiment. As previously described the system 80 includes optical components 82 and power components including power monitor and control 86 and power enable/disable 88. In the example shown in FIG. 8, the device 80 includes an auto detection module 85 that operates with a pulse power detection module 83 and PoE detection module 84. Each module 83, 84 is connected to its own power monitor and control module 86 and power enable/disable module 88. The circuit detects the type of power applied to the device 80, determines if PoE or pulsed power is a more efficient power delivery method, and then uses the selected power delivery mode. Additional modes may support other power+data standards (e.g., USB (Universal Serial Bus)).

As previously described, the optical transceiver may comprise different types of optical transceivers, including for example, an optical transceiver module or silicon photonics optical transceiver. The term "optical transceiver" as used herein may refer to any type of optical component, module, or device operable to receive and transmit optical signals. FIGS. 11A-11B illustrate an example of an optical module configured to contact an electrical interface plate on a modified fiber connector (FIGS. 10A-10B) and pass power through an optical module cage system (FIGS. 12A-12B), as shown in the assembly of FIG. 13. It is to be understood that the optical transceivers shown in FIGS. 11A and 11B are only examples and that other optical devices configured to receive and transmit power and data may be used to implement PoE+F without departing from the scope of the embodiments.

Figure 9A:
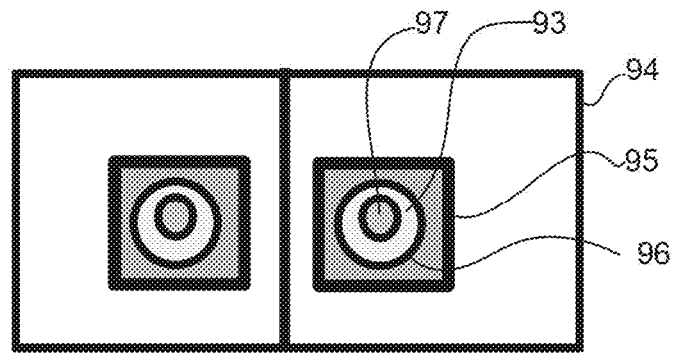
FIG. 9A is a front view of a fiber connector for use in the PoE+F system, in accordance with one embodiment.
Figure 9B:
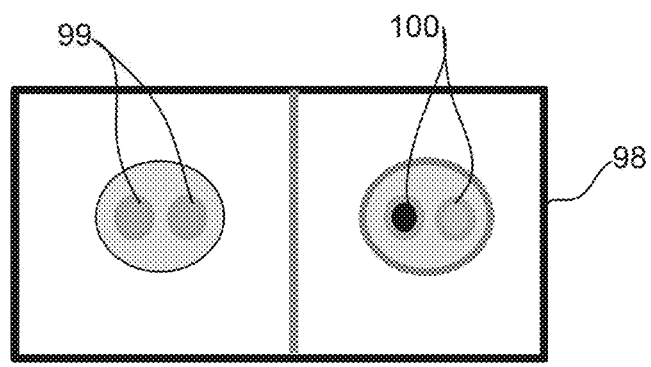
FIG. 9B is a front view of the fiber connector, in accordance with another embodiment.
Figure 9C:
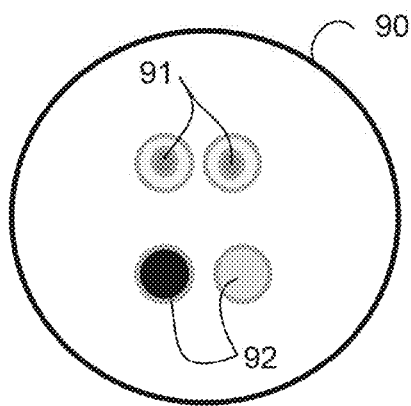
FIG. 9C is a cross-sectional view of a power and data fiber cable for use with the fiber connector, in accordance with one embodiment.

Referring now to FIGS. 9A and 9B, two examples of a modified fiber connector are shown for receiving power and fiber from a cable 90 comprising optical fibers and electrical wires, as shown in FIG. 9C. The connector may comprise, for example, a modified LC (Local Connector, Lucent Connector) generally corresponding to a standard LC format. In the example shown in FIG. 9C, the cable 90 includes two data fibers 91 and two electrical wires 92 (e.g., copper, aluminum, metal) enclosed in a cable jacket.

In one example, the copper wires may be 18 AWG (American Wire Gauge) or another size/capacity (e.g., 10 AWG), or any other suitable size or capacity according to any applicable standard. The copper wires 92 may be bonded separately to the optical connector, which allows a modified LC connector system to be implemented without extending a bulkhead connection. As described below, a crimp system may be used to connect the copper wires 91 to the respective plus/minus (plus/return, power/return) connections. It is to be understood that the optical fiber and electrical wire arrangement of the cable 90 shown in FIG. 9C is only an example. The cable may include any number of optical fibers 91 or electrical wires 92 in any arrangement. For example, the cable may include additional data fibers or power wires as described below with respect to a modified MPO (Multi-fiber Push On/Pull Off) connector shown in FIGS. 16A, 16B, 17A, and 17B. The cable may also include cooling as described below with respect to FIG. 15.

In the connector 94 shown in the example of FIG. 9A, chassis ground is on an outer case 95, copper (metal) contact 96 for power is on the outside of a ferrule 93, and fiber 97 is inside the ferrule. In this example, the outer housing 95 is metalized for digital ground and the outer ferrule 96 is metalized for power. Data fiber 97 is in ferrule 93, as with conventional LC connectors. In another example, ground may be connected on one side of the dual connector at the outer ferrule instead of the outer case on both sides of the connector.

In another dual LC connector 98 example shown in FIG. 9B, one side of a connector contains two fibers 99 and the other side of the connector contains power wires 100. It is to be understood that the configurations shown in FIGS. 9A and 9B are only examples and that other arrangements may be used without departing from the scope of the embodiments.

Figure 10A:
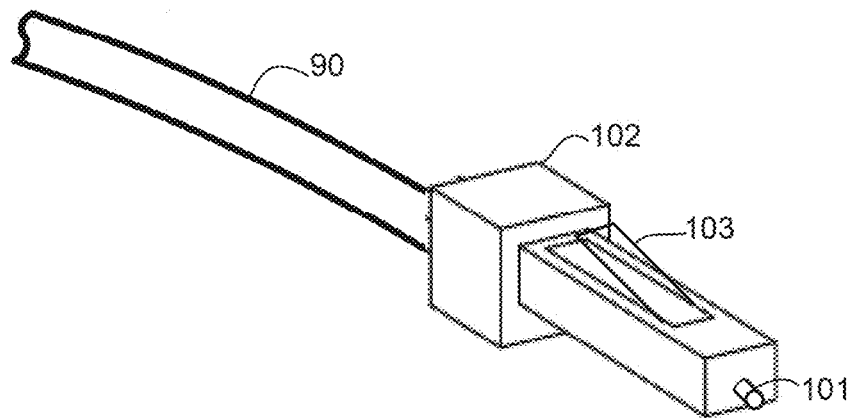
FIG. 10A is a top perspective of the fiber connector, in accordance with one embodiment.
Figure 10B:
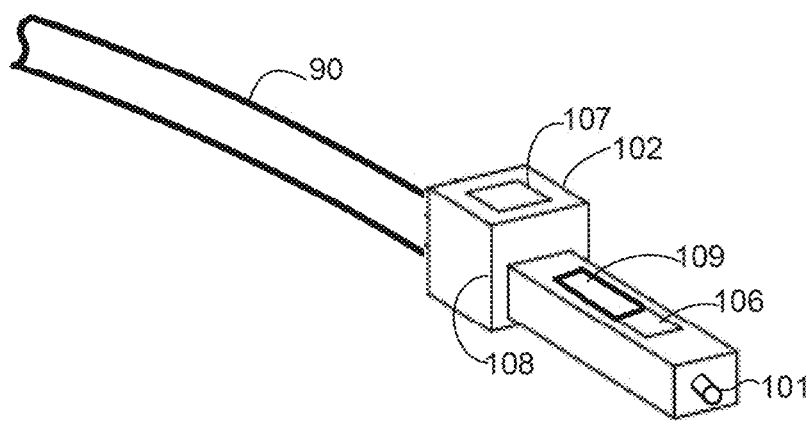
FIG. 10B is a bottom perspective of the fiber connector of FIG. 10A.
Figure 11A:
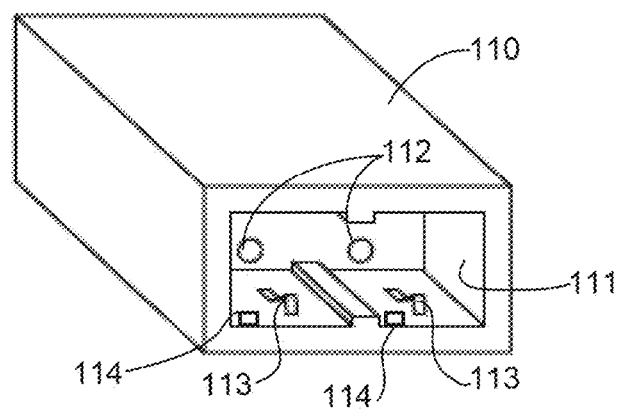
FIG. 11A is a front perspective of an optical module for use in the PoE+F system, in accordance with one embodiment.
Figure 11B:
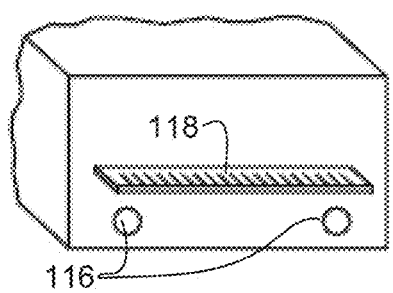
FIG. 11B is a rear perspective of the optical module of FIG. 11A.

FIGS. 10A and 10B illustrate details of one example of an LC connector 102 modified to include an external contact plate and a crimp point for which electrical wires can be crimped onto the connector. As with conventional LC connectors, the connector 102 includes a latch mechanism 103 on an upper side that allows the connector to be easily engaged and disengaged. The connector 102 mechanically couples and aligns the fibers in ferrule 101 so that light can pass through to the optical transceiver. The modified connector 102 receives a cable (e.g., cable 90 shown in FIG. 9C) comprising optical fiber (or fibers) and power wire (or wires). As shown in the bottom view of FIG. 10B, the connector 102 further comprises an external metal contact plate (e.g., one or more copper pads) 106 and crimp point 107 onto which the copper wire can be crimped. As described below with respect to FIG. 11A, the optical module includes an internal electrical input (e.g., tab or wire contact) for interface with the contact plate 106. A portion 108 of the connector body may be extended to allow for the copper wire to be crimped using a standard press-in crimp method. In one embodiment, the housing 108 is elongated to support 10, 12, 14, 16, or 18 AWG wire systems.

In one or more embodiments, a spring loaded slide cover 109 (shown partially open in FIG. 10B) may be provided to cover the electrical contact point 106 as the connector is removed from the optical device to prevent energized cable from becoming grounded during handling. The cover 109 is pushed back during insertion of the connector 102 into the optical device, thereby allowing mating contact between the external contact plate 106 and the internal contact point on the optical module when the connector is inserted. If the optical device is not configured to receive power (conventional non-power LC connector), communications compatibility is maintained through the common LC connector interface.

It is to be understood that the connector shown in FIGS. 10A and 10B is only an example and that other connectors or configurations may be used without departing from the scope of the embodiments. For example, in one embodiment, an MPO (Multi-fiber Push On/Pull Off) coupling may be used. Also, a single fiber system is shown in FIGS. 10A and 10B, however, two LC connectors in a duplex fiber system may be used as previously described with respect to FIGS. 9A and 9B to provide for a power wire and a return wire to interconnect with the optical device.

FIGS. 11A and 11B illustrate an example of an optical module 110 configured to receive power from the modified LC connector 102 of FIG. 10B and pass the power through the optical module. The optical module 110 includes an opening 111 configured for receiving two connectors 102 at a front end (FIGS. 10A and 11A). A rear wall of the opening 111 includes fiber inputs 112. The optical module 110 further includes internal electrical input contacts (power tabs, wires, angled spring fingers) 113 for contact with the connector external power pad 106 (FIGS. 10B and 11A). The optical device 110 sources power or receives power through these contact points 113. In one example, the system is configured to handle PoE class 8 systems (up to 100 W), as well as other power distribution systems such as pulsed power. In one embodiment, the optical module 110 may include keying to prevent insertion of certain types of cables into incompatible modules.

In one embodiment, a hook/post arrangement 114 is used to slide the protective cover 109 out of the way to allow for contact between the external contact plate 106 on the connector 102 and the internal electrical power input tab 113 on the optical module 110.

As shown in the rear view of FIG. 11B, two female receptacles 116 are provided to connect to the system module cage (FIG. 12B), along with the electrical signal interface 118 for data and control. If different types of modules are used for PD and PSE interfaces, one may include male pins and the other female sockets. The use of female connectors for power at the rear of the module allows for the module to be accidentally removed under power without damaging anything or anyone. The power output points 116 may be located on a lower portion of the optical device 110 as shown in FIG. 11B or an upper portion of the device.

Figure 12A:
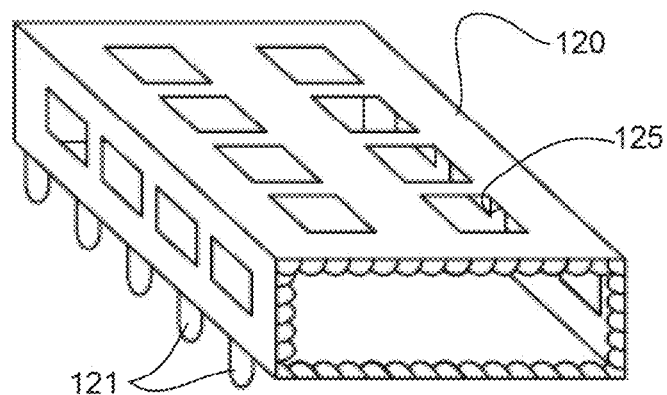
FIG. 12A is a front perspective of an optical module cage for use in the PoE+F system, in accordance with one embodiment.
Figure 12B:
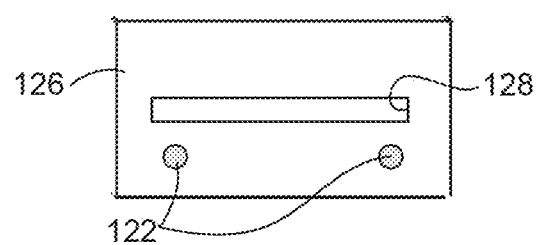
FIG. 12B is an internal view of a rear wall of the optical module cage of FIG. 12A.
Figure 13:
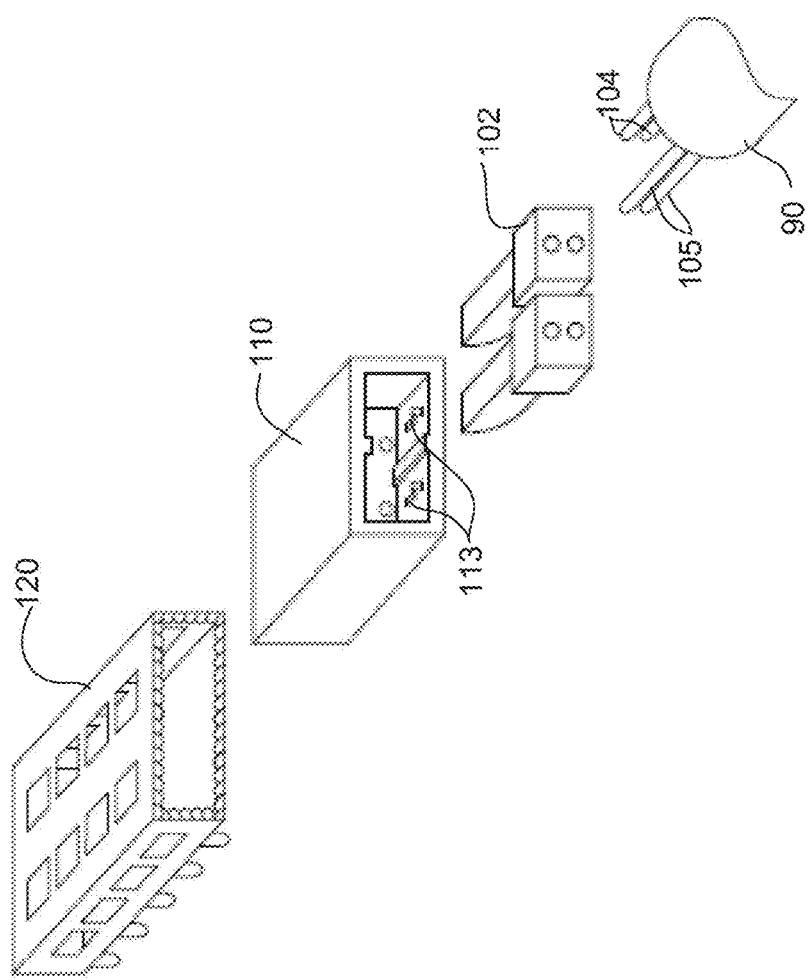
FIG. 13 is an exploded view of the cable, connector, optical module, and optical module cage, in accordance with one embodiment.

FIGS. 12A-12B illustrate an example of an optical module cage 120 for the optical module shown in FIGS. 11A-11B. The optical module cage 120 may include cage ground points 121 and air flow openings 125, for example. As shown on the internal rear wall 126 of the module cage in FIG. 12B, the cage is modified to include two male power posts 122 (+, return) for mating with the female receptacles 116 on the optical module (FIGS. 11B and 12B). The rear wall further includes an opening 128 with contacts for receiving electrical signal interface 118. As previously described with respect to the optical module, the module cage interface may also include keying to prevent a mismatch between incompatible components.

FIG. 13 is an exploded view showing the fiber and power cable 90, connectors 102, optical module 110, and optical module cage 120, in accordance with one embodiment. In this example, the cable 130 includes two optical fibers 104 and two power wires 105 for connection with the modified LC connector 102 comprising power pads added to a bottom of the connector and a crimping mechanism to allow for attachment of the copper wires 105, as shown in FIG. 10B. The modified optical module 110 passes through the power received at electrical contact points 113 from the connector 102 to the optical module cage 120, which passes power through to the circuit board (e.g., line card, route processor, fabric card).

Figure 14:
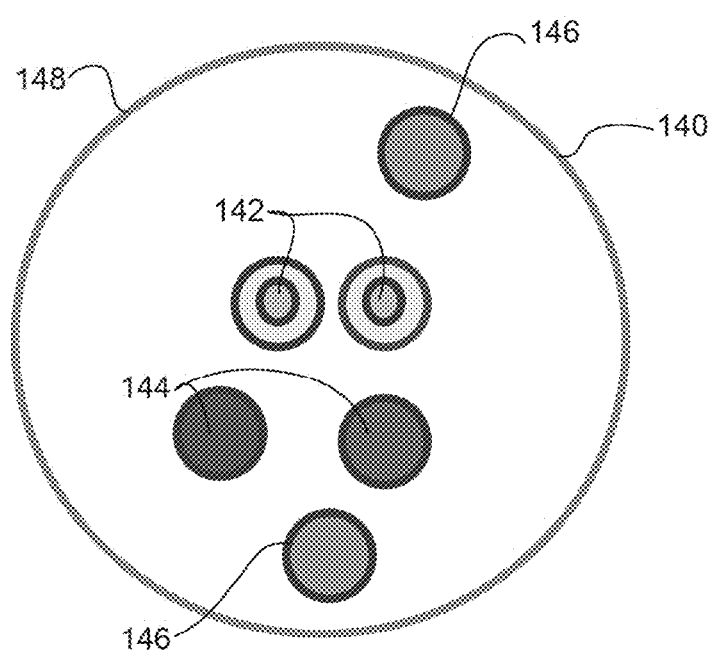
FIG. 14 is a cross-sectional view of one example of a cable for use in the PoE+F system.

As previously noted, the power and fiber cable may also include cooling. FIG. 14 is a cross-sectional view of a cable design incorporating fiber, power, and cooling. In this example, a cable 140 includes two data fibers 142, two copper wires 144, and two cooling pipes 146. The cooling lines may, for example, deliver water, refrigerant, or high pressure air to the powered device and powered equipment. The system may be used to provide cooling to devices and equipment in remote areas where traditional cooling is not available. The cable jacket 148 may provide additional insulation, along with insulation on the cooling pipes 146 to provide effective cooling over a 10 km reach, for example.

Figure 15:
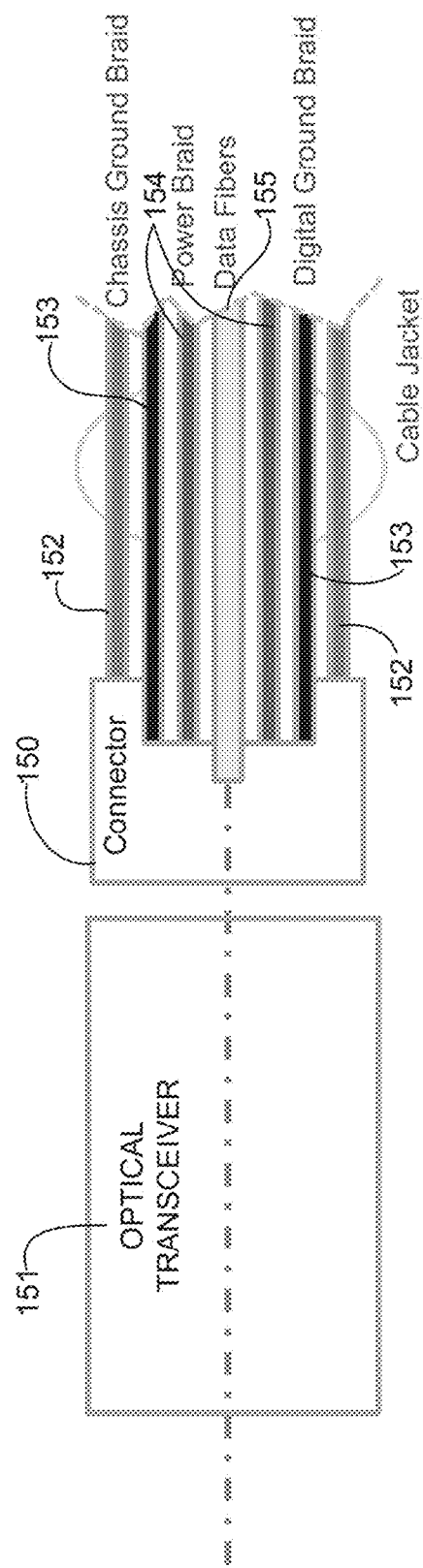
FIG. 15 is a side view of a connector and cable assembly and optical module for use in the PoE+F system, in accordance with one embodiment.

FIG. 15 illustrates an example of a connector cable assembly comprising power, fiber, and cooling, in accordance with one embodiment. A connector (e.g., modified MPO connector) 150 provides power and data to optical transceiver 151. Press crimp interconnectors may be used to terminate power, ground, and shield, as previously described. The example shown in FIG. 15 includes two chassis grounds 152, two signal grounds 153, and two optical fibers 155. Power 154 may include one connection or two or more pins/mates. The cable may also include cooling pipes (e.g., two cooling pipes and two return pipes) (not shown). The connector cable assembly may also be configured to include additional fibers (e.g., from two to twenty-four fibers).

Figure 16:
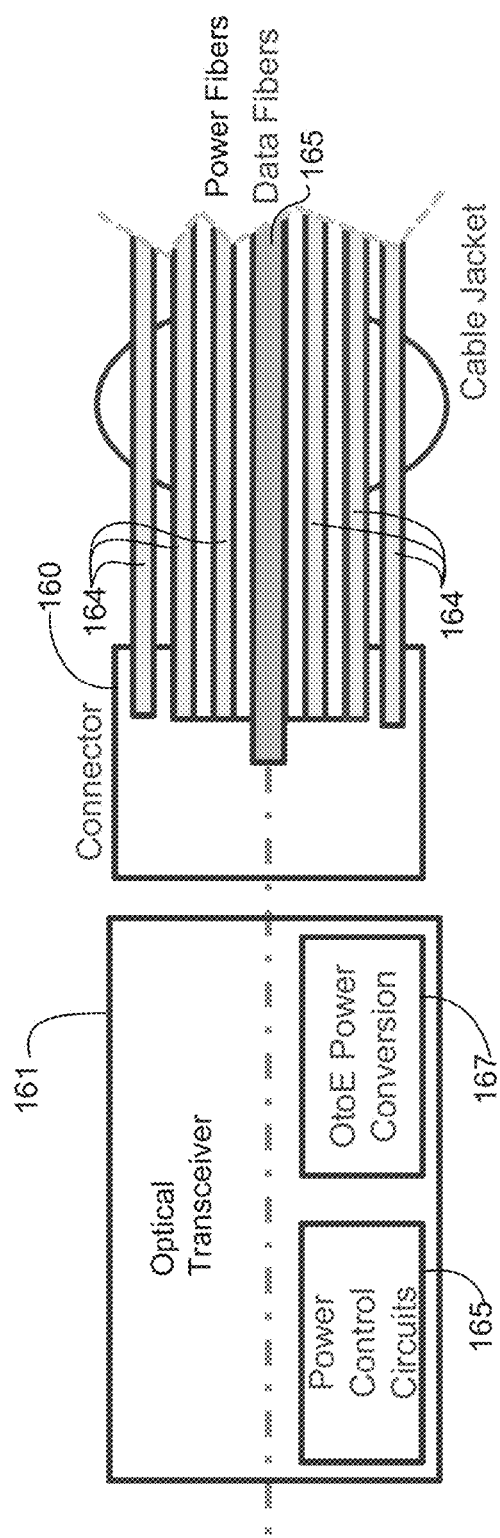
FIG. 16 is a side view of a connector and cable assembly and optical module, in accordance with another embodiment.

FIG. 16 shows another example of a connector 160. The optical transceiver 161 is shown with power control circuits 165 and optical to electrical power conversion module 167. In this example, the connector 160 and optical module 161 are configured for six power fibers 164 and two optical fibers 165 for data. In this example, power is delivered optically over fibers 164. The connector cable assembly shown in FIG. 16 may comprise any number or combination of power and optical fibers.

It is to be understood that the configuration, arrangement, and number of power/ground wires and fibers shown in FIGS. 15 and 16 are only examples and that other arrangements or number of wires and fibers may be used without departing from the scope of the embodiments.

Figure 17:
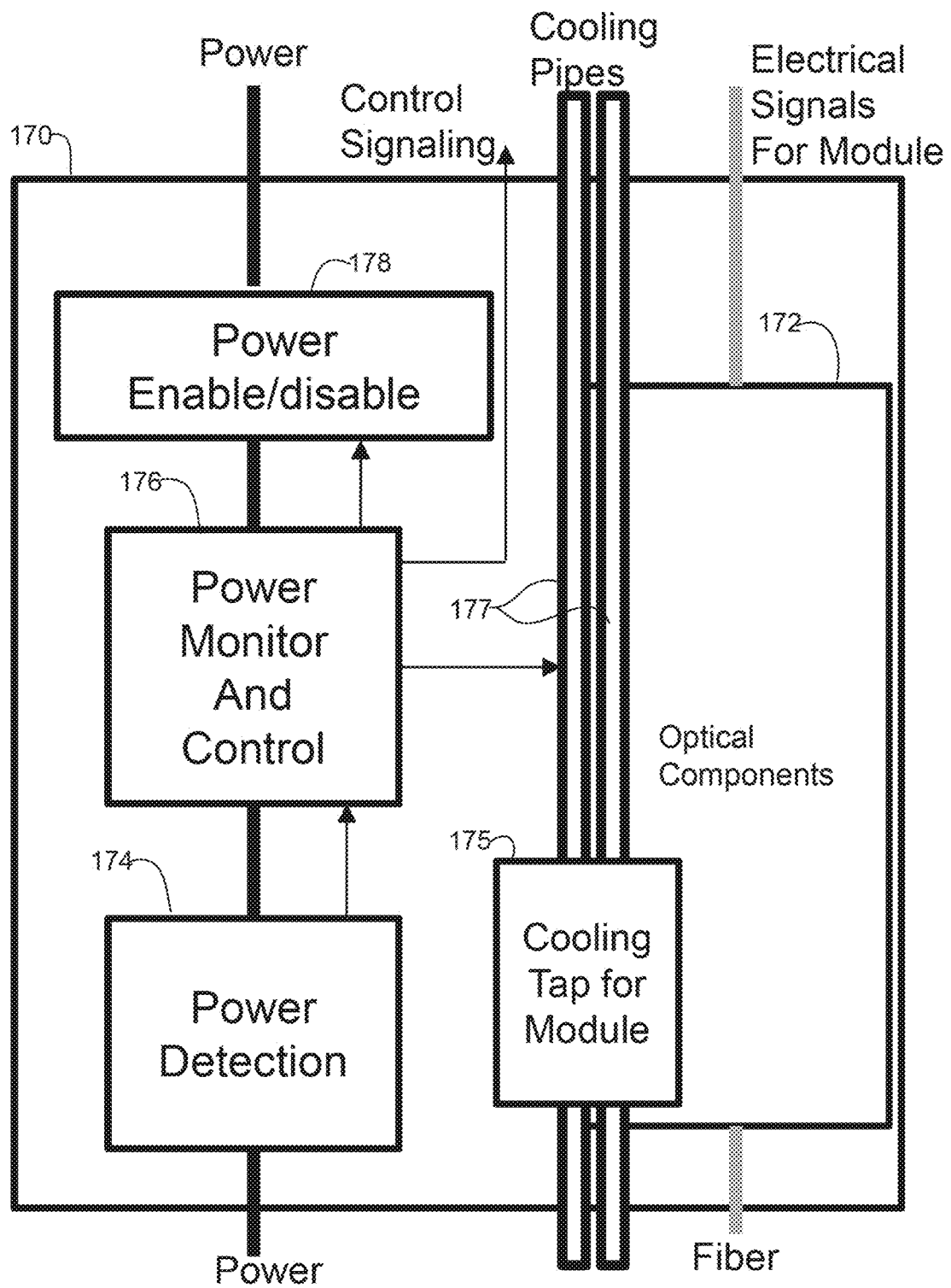
FIG. 17 is a block diagram of the smart optical module of FIG. 7 with cooling, in accordance with one embodiment.

FIG. 17 illustrates the smart optical device of FIG. 7 with cooling pass-through lines. As previously described, the optical device 170 includes optical components 172, power detection 174, power monitor and control 176, and power enable/disable 178. The optical device 170 may also include additional components shown in FIG. 8, for example. The cooling pipes 177 provide cooling to the powered equipment and return cooling. A cooling tap 175 is also provided for the optical module 170. In one embodiment, the optical module cage passes the cooling through to the system and returns the heat generated within the optical components 172 out through the module and into the coolant.

As can be observed from the foregoing, the embodiments described herein may provide many advantages. For example, one or more embodiments may allow for lengths from a building entry point to end points of up to 10 km. Network communications devices such as routers, switches, and access points, and electronic devices such as lighting systems and other applications may be located outside of the 100 m range of traditional PoE systems. This allows all electrical power to be removed from floor data rooms. Use of a modified connector system allows for fiber compatibility between systems where one or both sides may not be using power over copper delivery to power network equipment. For example, the connector assembly may be configured for operation with PoE+F optical systems or conventional non-power optical systems.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An optical transceiver comprising:
   an optical interface for receiving an optical signal on an optical fiber in a cable;
   an electrical interface for receiving power on an electrical wire in the cable;
   an optical component for converting the optical signal to an electrical signal; and
   a power component for detecting and monitoring the power at the optical transceiver, transmitting a message to a central network device delivering the power to indicate that a network communications device is ready to be powered at an increased power level, and providing the power to the network communications device.

2. The optical transceiver of claim 1, wherein the power component is further operable to detect a type of power received.

3. The optical transceiver of claim 2, wherein the type of power comprises Power over Ethernet or pulsed power.

4. The optical transceiver of claim 1, wherein the power component is further operable to select a power delivery mode from Power over Ethernet or pulsed power.

5. The optical transceiver of claim 1, wherein the power component is operable to perform a power negotiation with the central network device to select a power delivery mode.

6. The optical transceiver of claim 1, wherein said increased power level comprises delivery of power from the central network device at a power level greater than 100 watts.

7. The optical transceiver of claim 1, wherein the optical fiber comprises a plurality of optical fibers and the electrical wire comprises a plurality of electrical wires and wherein the cable further comprises a cooling pipe for delivering cooling to the optical transceiver.

8. A powered device comprising:
   an optical interface for receiving an optical signal on an optical fiber in a cable from a central network device;
   an electrical interface for receiving power on an electrical wire in the cable from the central network device; and
   a power component for detecting the power received by the electrical interface, determining that the powered device is operable to support an increase in a power level, and transmitting a message to the central network device to increase the power level, wherein the power at an increased power level is delivered as pulsed power.

9. The powered device of claim 8, wherein the central network device comprises a power supply and a plurality of line cards for delivering the power and data to a plurality of powered devices.

10. The powered device of claim 8, further comprising a second optical interface and a second electrical interface for receiving redundant power and data on a second cable from a second central network device.

11. A network device comprising:
    an optical transceiver comprising:
       an optical interface for transmitting an optical signal on an optical fiber in a cable, and
       an electrical interface for transmitting power on an electrical wire in the cable;
    a power supply unit for providing the power to the optical transceiver; and
    a control device for receiving power information from a network communications device receiving the optical signal and the power, and modifying a power level of the power based on a power level negotiation in which a determination is made whether to increase, decrease, or maintain the power level.

12. The network device of claim 11, further comprising a second power supply unit, wherein the network device is operable to provide a power output of at least 500 watts.

13. The network device of claim 11, wherein the electrical interface is operable to transmit one of Power over Ethernet and pulsed power and switch between transmission of said Power over Ethernet and said pulsed power.

14. The network device of claim 11, wherein modifying said power level comprises changing a power delivery mode from Power over Ethernet to pulsed power.

15. The network device of claim 11, further comprising a plurality of line cards for delivering the power and data over a plurality of cables.

16. A method comprising:
    receiving power and data delivered from a central network device over a cable comprising an optical fiber and an electrical wire at an optical transceiver installed in a network communications device, wherein the data is processed at the network communications device and the power is used to power the network communications device;
    monitoring the power at the optical transceiver includes detecting a type of the power; and
    transmitting a message from the optical transceiver to the central network device based on monitoring of the power.

17. The method of claim 16, further comprising selecting a power delivery mode at the optical transceiver.

18. The method of claim 17, wherein the power delivery mode is selected from Power over Ethernet and pulsed power.

19. The method of claim 18, further comprising:
    determining which of said Power over Ethernet and said pulsed power to select as a power delivery method.

20. The method of claim 16, further comprising performing a power negotiation with the central network device to select a power delivery mode comprising pulsed power.

21. The method of claim 16, wherein transmitting said message comprises providing a state change on one of the electrical wire and the optical fiber.

22. The method of claim 16, wherein said message indicates the network communications device is ready to receive an increase in power level of the power.

23. The method of claim 16, wherein the power and the data are delivered from another optical transceiver at the central network device.

24. A method comprising:
  receiving a communications signal and power over a cable comprising one or more optical fibers and one or more electrical wires at an optical transceiver installed at a network communications device, wherein said one or more optical fibers are coupled to an optical component and said one or more electrical wires are coupled to power and electrical communication components; and
  detecting a type of power received at the network communications device, the type of power comprising pulsed power.

25. The method of claim 24, wherein the pulsed power is received at the network communications device as an alternating high direct current voltage state and low direct current voltage state.

\* \* \* \* \*